(12) United States Patent
Bracamontes Del Toro

(10) Patent No.: US 7,769,933 B2
(45) Date of Patent: *Aug. 3, 2010

(54) SERIALIZATION OF DATA FOR COMMUNICATION WITH MASTER IN MULTI-CHIP BUS IMPLEMENTATION

(75) Inventor: Rocendo Bracamontes Del Toro, Hurbanovo (SK)

(73) Assignee: Atmel Corporation, San Jose, CA (US)

( * ) Notice: Subject to any disclaimer, the term of this patent is extended or adjusted under 35 U.S.C. 154(b) by 122 days.

This patent is subject to a terminal disclaimer.

(21) Appl. No.: 11/741,156

(22) Filed: Apr. 27, 2007

(65) Prior Publication Data

US 2008/0270667 A1  Oct. 30, 2008

(51) Int. Cl.
G06F 13/42 (2006.01)
G06F 13/00 (2006.01)
(52) U.S. Cl. .................. 710/110; 710/105; 710/60; 710/33; 710/71; 710/25; 710/29; 710/305; 710/300; 710/316
(58) Field of Classification Search ......... 710/105–110, 710/100, 300, 305–307, 316–317, 25–29, 710/33–35, 58–61, 71
See application file for complete search history.

(56) References Cited

U.S. PATENT DOCUMENTS

| | | | |
|---|---|---|---|
| 4,688,171 A * | 8/1987 | Selim et al. ............ 709/208 |
| 5,058,051 A | 10/1991 | Brooks | |
| 5,507,001 A | 4/1996 | Nishizawa | |
| 5,581,745 A | 12/1996 | Muraoka et al. | |
| 5,835,736 A | 11/1998 | Maeda et al. | |
| 5,915,666 A * | 6/1999 | Hayashi et al. ........ 251/129.01 |
| 6,085,278 A | 7/2000 | Gates et al. | |
| 6,442,642 B1 | 8/2002 | Brooks | |
| 6,567,876 B1 | 5/2003 | Stufflebeam | |
| 6,710,726 B2 | 3/2004 | Kim et al. | |
| 6,751,695 B1 | 6/2004 | Jirgal | |
| 6,799,304 B2 | 9/2004 | Hammitt et al. | |
| 6,810,460 B1 | 10/2004 | Kirkwood | |
| 6,857,037 B2 | 2/2005 | Messmer et al. | |
| 6,868,459 B1 | 3/2005 | Stuber | |
| 6,996,655 B1 | 2/2006 | Lee et al. | |
| 7,010,612 B1 | 3/2006 | Si et al. | |
| 7,062,577 B2 | 6/2006 | Hammitt et al. | |
| 7,069,363 B1 | 6/2006 | Worrell | |
| 7,069,419 B2 | 6/2006 | Kundu et al. | |
| 7,096,137 B2 | 8/2006 | Shipton et al. | |
| 7,107,365 B1 | 9/2006 | Clark | |

(Continued)

FOREIGN PATENT DOCUMENTS

WO  WO-02/37288 A2  5/2002
WO  WO-2008/133940 A2  11/2008
WO  WO-2008/133940 A3  11/2008

OTHER PUBLICATIONS

Sudep Pasricha et al., Bus Matrix Communication Architecture Synthesis, Oct. 2005, CECS Technical Repport #05-13.*

(Continued)

*Primary Examiner*—Christopher B Shin
(74) *Attorney, Agent, or Firm*—Schwegman, Lundberg & Woessner, P.A.

(57) ABSTRACT

Bus communication for components of a system on a chip. In one aspect of the invention, a serializer for interfacing bus communications for a master in a bus system includes one or more shift registers that serialize information to send over a communication bus and deserialize information received from the communication bus. A mechanism provides parallel bus information from the master to the shift registers for serialization, where the mechanism provides deserialized information received from the shift registers to the master, and where the mechanism inserts one or more wait cycles in communication with the master during the serialization and deserialization.

28 Claims, 25 Drawing Sheets

U.S. PATENT DOCUMENTS

| | | | |
|---|---|---|---|
| 7,161,906 | B2 | 1/2007 | Dell et al. |
| 7,243,173 | B2 | 7/2007 | Campbell |
| 7,373,450 | B2 | 5/2008 | Kamegawa |
| 2002/0062408 | A1 | 5/2002 | Jahnke et al. |
| 2002/0162043 | A1 | 10/2002 | Messmer et al. |
| 2003/0149826 | A1 | 8/2003 | Kadota |
| 2003/0210071 | A1 | 11/2003 | Fowler |
| 2004/0064615 | A1 | 4/2004 | Hammitt et al. |
| 2004/0205267 | A1 | 10/2004 | Holm et al. |
| 2005/0138253 | A1 | 6/2005 | Chae |
| 2005/0177664 | A1 | 8/2005 | Cho et al. |
| 2005/0188144 | A1 | 8/2005 | Park et al. |
| 2006/0080492 | A1 | 4/2006 | Choi et al. |
| 2006/0165070 | A1 | 7/2006 | Hall et al. |
| 2007/0130409 | A1 | 6/2007 | Matsuse et al. |
| 2008/0084862 | A1 | 4/2008 | Oliver |
| 2008/0092001 | A1 | 4/2008 | Kodavalla et al. |
| 2008/0146260 | A1* | 6/2008 | Rofougaran ............... 455/466 |
| 2008/0146270 | A1* | 6/2008 | Rofougaran ............ 455/552.1 |
| 2008/0153541 | A1* | 6/2008 | Rakshani et al. ......... 455/552.1 |
| 2008/0158424 | A1 | 7/2008 | Park et al. |
| 2008/0270650 | A1* | 10/2008 | Bracamontes Del Toro . 710/105 |
| 2008/0270655 | A1* | 10/2008 | Bracamontes Del Toro . 710/110 |
| 2008/0270656 | A1* | 10/2008 | Bracamontes Del Toro . 710/110 |
| 2008/0270667 | A1* | 10/2008 | Bracamontes Del Toro . 710/306 |

OTHER PUBLICATIONS

"International Application Serial No. PCT/US2008/005284, Search Report mailed on Nov. 13, 2008", 8 pages.

"International Application Serial No. PCT/US2008/005284, Written Opinion mailed on Nov. 13, 2008", 7 pages.

"AMBA Design Kit Technical Reference Manual", Revision: r3p0, © 2003 ARM Limited, (2003), 284 pgs.

"U.S. Appl. No. 11/741,250, Non-Final Office Action mailed Nov. 26, 2008", 6 pgs.

"U.S. Appl. No. 11/741,250, Response filed Feb. 26, 2009 to Non-Final Office Action mailed Nov. 26, 2008", 8 pgs.

"U.S. Appl. No. 11/741,328, Response filed Feb. 23, 2009 to Non-Final Office Action mailed Nov. 21, 2008", 8 pgs.

"U.S. Appl. No. 11/741,328, Non-Final Office Action mailed Nov. 21, 2008", 5 pgs.

"U.S. Appl. No. 11/741,352, Non-Final Office Action mailed Dec. 22, 2008", 15 pgs.

"U.S. Appl. No. 11/741,352, Response filed Mar. 23, 2009 to Non Final Office Action mailed Dec. 22, 2008", 13 pgs.

"Low-Voltage Differential Signaling (LVDS)", [online]. Wikipedia®. [retrieved Dec. 19, 2008]. Retrieved from the Internet: <http://en.wikipedia.org/wiki/Low_voltage_differential_signalling>, (2008), 5 pgs.

Landry, A., et al., "A Novel 2GHz Multi-Layer AMBA High Speed Bus Interconnect Matrix doe SoC Platforms", *IEEE International Symposium on Circuits and Systems (ISCAS 2005)*, (2005), 3343-3346.

Lewis, D., "Serdes Architecture and Applications", *DesignCon 2004*, (2004), 14 pgs.

Pasricha, S., et al., "Bus Matrix Communication Architecture Synthesis", *CECS Technical Report #05-13*, (2005), 12 pgs.

Sawyer, N., "High- Speed Data Serialization and Deserialization (840 Mb/s LVDS)", *XAPP265(1.3)*, XILINX®, (Jun. 19, 2002), 13 pgs.

"U.S. Appl. No. 11/741,250, Notice of Allowance mailed Jun. 30, 2009", 7 pgs.

"U.S. Appl. No. 11/741,328, Notice of Allowance mailed Apr. 22, 2009", 7 pgs.

"U.S. Appl. No. 11/741,328, Notice of Allowance mailed Sep. 25, 2009", 5 pgs.

"U.S. Appl. No. 11/741,352, Final Office Action mailed on Jun. 18, 2009 ", 26 Pgs.

"U.S. Appl. No. 11/741,250, Notice of Allowance mailed Feb. 9, 2010", 4 pgs.

"U.S. Appl. No. 11/741,328, Notice of Allowance mailed Jan. 28, 2010", 5 Pgs.

"U.S. Appl. No. 11/741,352, Non-Final Office Action mailed Nov. 17, 2009", 6 Pgs.

"U.S. Appl. No. 11/741,352, Response filed Oct. 16, 2009 to Final Office Action mailed Jun. 18, 2009", 11 pgs.

" U.S. Appl. No. 11/741,250, Notice of Allowance mailed Oct. 28, 2009", 5 Pgs.

* cited by examiner

SERIALIZATION OF DATA FOR COMMUNICATION WITH MASTER IN MULTI-CHIP BUS IMPLEMENTATION

FIELD OF THE INVENTION

The present invention relates to integrated circuit systems, and more particularly to bus architectures for integrated circuit systems.

BACKGROUND OF THE INVENTION

System-on-a-Chip (SoC) designs integrate many or all components of a computer or other electronic device or system into an integrated circuit chip, and are commonly used to consolidate components for increased system performance and ease of manufacturing. A typical SoC includes one or more microcontrollers (e.g., microprocessor or DSP core), memory, peripherals, interfaces, timing sources, voltage regulators and power management circuits, and external interfaces.

The components of an SoC are connected by either a proprietary or industry-standard on-chip bus, which allows the components of the SoC to interface with each other. One such industry standard bus is the Advanced Microcontroller Bus Architecture (AMBA™) from ARM Ltd., a common 32-bit architecture for embedded CPUs. The AMBA on-chip bus is an open specification that serves as a framework for SoC designs. Use of the AMBA specification can bind library cores together and is an enabler of library component reuse. By designing to the standard AMBA interface, modules can be implemented and tested without prior knowledge of the system into which the component will finally be integrated.

The AMBA bus includes two different protocols, Advanced High performance Bus (AHB) and Advanced Peripheral Bus (APB). The AHB bus is higher speed than the APB bus and typically acts as the high-performance system backbone bus.

FIG. 1 is block diagram of a typical AMBA system 10 and shows the integration of the AMBA AHB and APB buses using a multi-layer interconnection matrix. The multiple layers include an AHB matrix 12 which connects AHB-Lite masters 14 to AHB-Lite slaves 16, as well as an AHB/APB bridge 18 that connects APB slaves 20 to the AHB matrix 12. A bus master is able to initiate read and write operations by providing an address and control information. Typically, only one master is allowed to actively use the bus at any one time. A bus slave responds to a read or write operation within a given address-space range. The slave signals back to the active master the success, failure or waiting of the transfer.

The masters and slaves used in the system 10 can be standard AMBA AHB components, or "AHB-Lite" components (as shown in FIG. 1). AHB-Lite is a subset of the full AHB specification and can be used in designs where a single bus master is used, either a simple single-master system, or a multi-layer AHB system where there is only one AHB master per layer. AHB-Lite simplifies the AHB specification by removing the protocol required for multiple bus masters, so that masters designed to the AHB-Lite interface specification can be simpler in terms of interface design, as compared to a full AHB master.

FIG. 2 is a block diagram illustrating an AMBA bus system 40 including two integrated circuit chips. A common approach is to split the components of a SoC over two or more chips, such as chips 42 and 44, which communicate with each other using a standard interface such as AMBA. Typically, the AHB and APB bus interface is made available outside of each chip for each master and slave, to allow the interfacing to other chips. In FIG. 2, the AHB buses 46 and APB buses 48 interconnect the two chips 42 and 44, where chip 44 provides 12 extra masters and slaves for the system 40.

A disadvantage of the system as shown in FIG. 2 is that the complexity and the overall cost of the system grows exponentially based on the number of AHB and APB interface buses needed across all chips in the entire system. On average, the number of lines needed for each AHB and APB bus is in the order of 100 or above; this number depends on the number of addresses needed by the slaves. This approach becomes impractical to achieve when the number of AHB and APB interface buses needed reaches the limit of I/O pins available. In other words, the maximum number of AHB and APB interface buses depends directly on the number of I/O pins available.

Thus, for example, in the example of FIG. 2, if the average number of lines per bus is 100, and this number of lines is multiplied by the number of masters and slaves (12), then at least 1,200 I/O pins are needed to satisfy the interface requirements. Thus if multiple masters and slaves are included in the system, as is commonly the case, the number of communication lines needed can increase greatly, which can be impractical and/or greatly increases the complexity and expense of the SoC due to the high demand of I/O pins.

Accordingly, a method and system of connecting components of a system on a chip with a bus architecture without requiring the numerous communication lines and accompanying complexity, would be desirable in many applications.

SUMMARY OF THE INVENTION

The invention of the present application relates to bus communication for components of a system on a chip. In one aspect of the invention, a serializer for interfacing bus communications for a master in a bus system includes one or more shift registers that serialize information to send over a communication bus and deserialize information received from the communication bus. A mechanism provides parallel bus information from the master to the shift registers for serialization, where the mechanism provides deserialized information received from the shift registers to the master, and where the mechanism inserts one or more wait cycles in communication with the master during the serialization and deserialization.

In another aspect of the invention, a method for interfacing bus communications for a master in a bus system includes receiving parallel bus information from a master, the parallel bus information addressed to a slave, and serializing the parallel bus information and sending the serial information on a communication bus. A wait cycle to the master is inserted during the serialization of the parallel bus information and sending of serial information. A similar aspect of the invention is provided for a computer readable medium including program instructions for implementing similar features.

In another aspect of the invention, a method for interfacing bus communications for a master in a bus system includes receiving serial information on a communication bus, the serial information derived from information provided by a master and addressed to a slave. The serial information is deserialized to obtain parallel information and the parallel information is provided to a bus matrix for sending to the slave. A response to the parallel information from the bus matrix is received and serialized to provide the response to the master. A similar aspect of the invention is provided for a computer readable medium including program instructions for implementing similar features.

In another aspect of the invention, a system including bus communication to a master includes a master operative to read and write information to a slave of the system, where the master is provided on a first device. A first serializer is coupled to the master and provided on a first device, and serializes the information received from the master and sends the serialized information over a communication bus. A second serializer is provided on a second device and is coupled to the communication bus, and receives the serialized information and deserializes the serialized information. A bus matrix provided on the second device is coupled to the second serializer, and selects destinations for information on multiple buses connected to the bus matrix, where the deserialized information is provided to the bus matrix to be routed to the slave.

The present invention reduces interconnection complexity and expense when providing a bus system, such as an AMBA system, across multiple devices such as chips. The number of lines needed to allow inter-chip masters and slaves to communicate in the system is reduced by an order of magnitude. Also, the cost of the overall system board is reduced since the expensive high demand for I/O pins is reduced.

DETAILED DESCRIPTION

The present invention relates to integrated circuit systems, and more particularly to bus architectures for integrated circuit systems. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention is mainly described in terms of particular circuits provided in particular implementations. However, one of ordinary skill in the art will readily recognize that this circuit will operate effectively in other implementations and applications. The present invention will also be described in the context of particular methods having certain steps or states. However, the method and system operate effectively for other methods having different and/or additional steps not inconsistent with the present invention.

To more particularly describe the features of the present invention, please refer to FIGS. 3 to 29 in conjunction with the discussion below.

Figure 1:
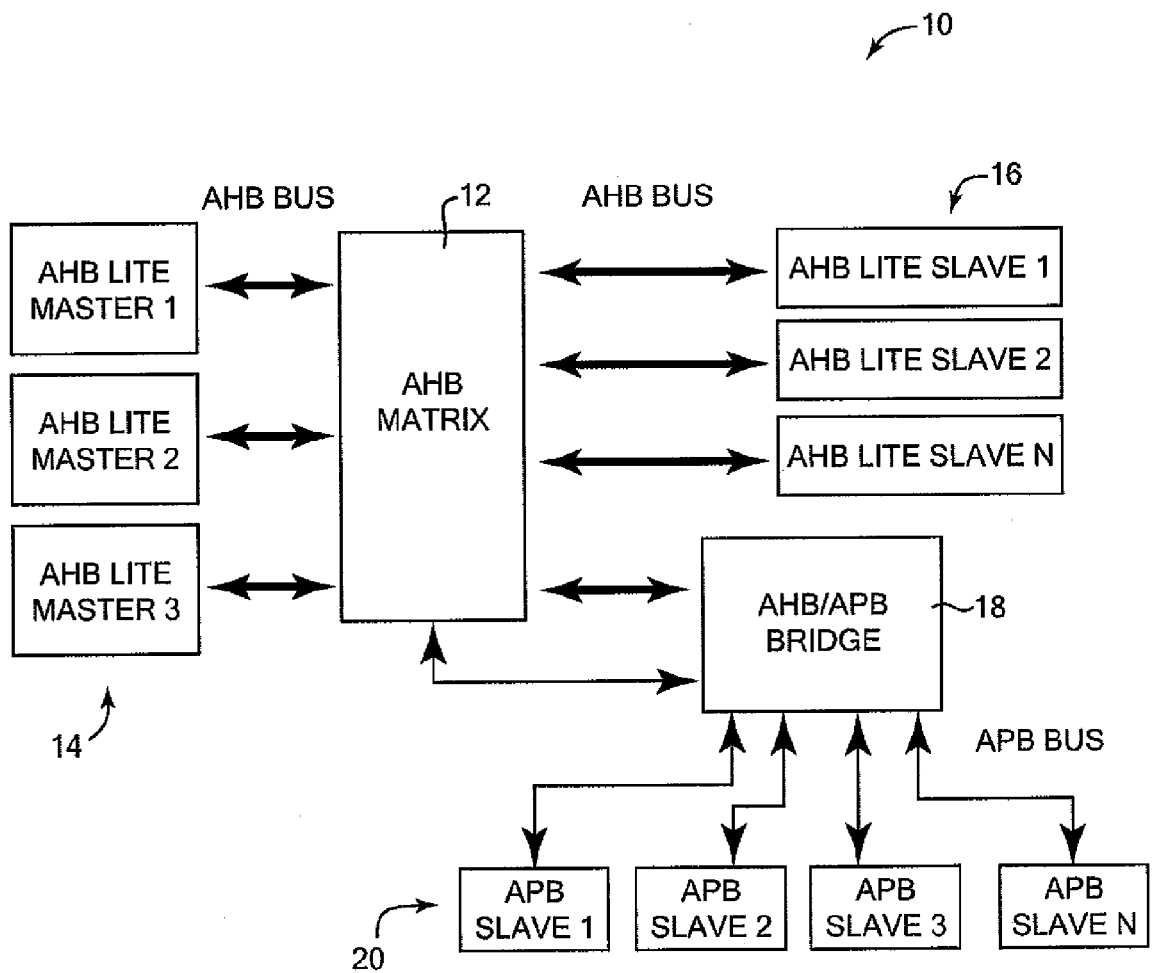
FIG. 1 is a block diagram of a standard system on a chip and bus architecture of the prior art.
Figure 2:
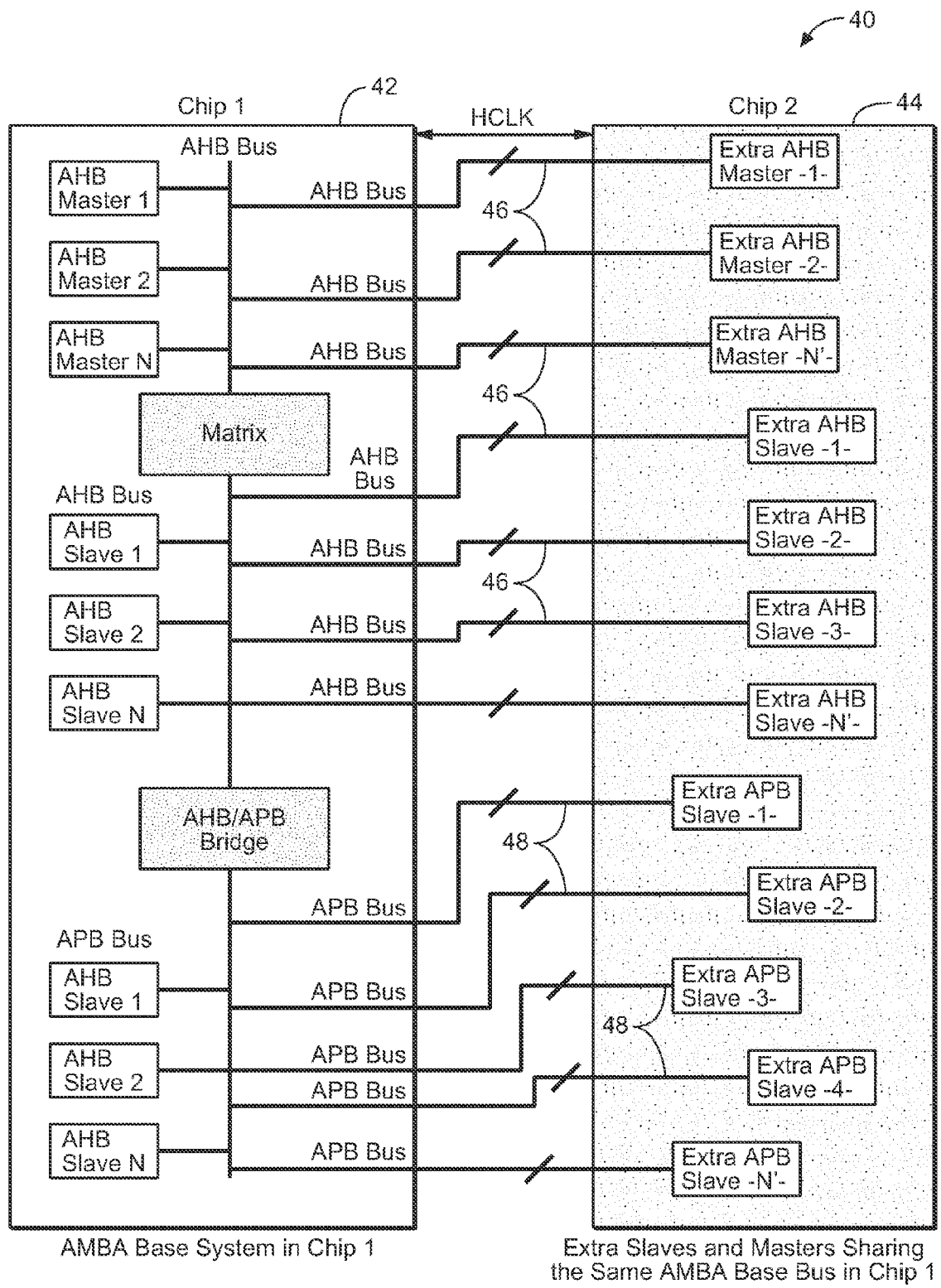
FIG. 2 is a block diagram of a multi-chip system on a chip of the prior art.
Figure 3:
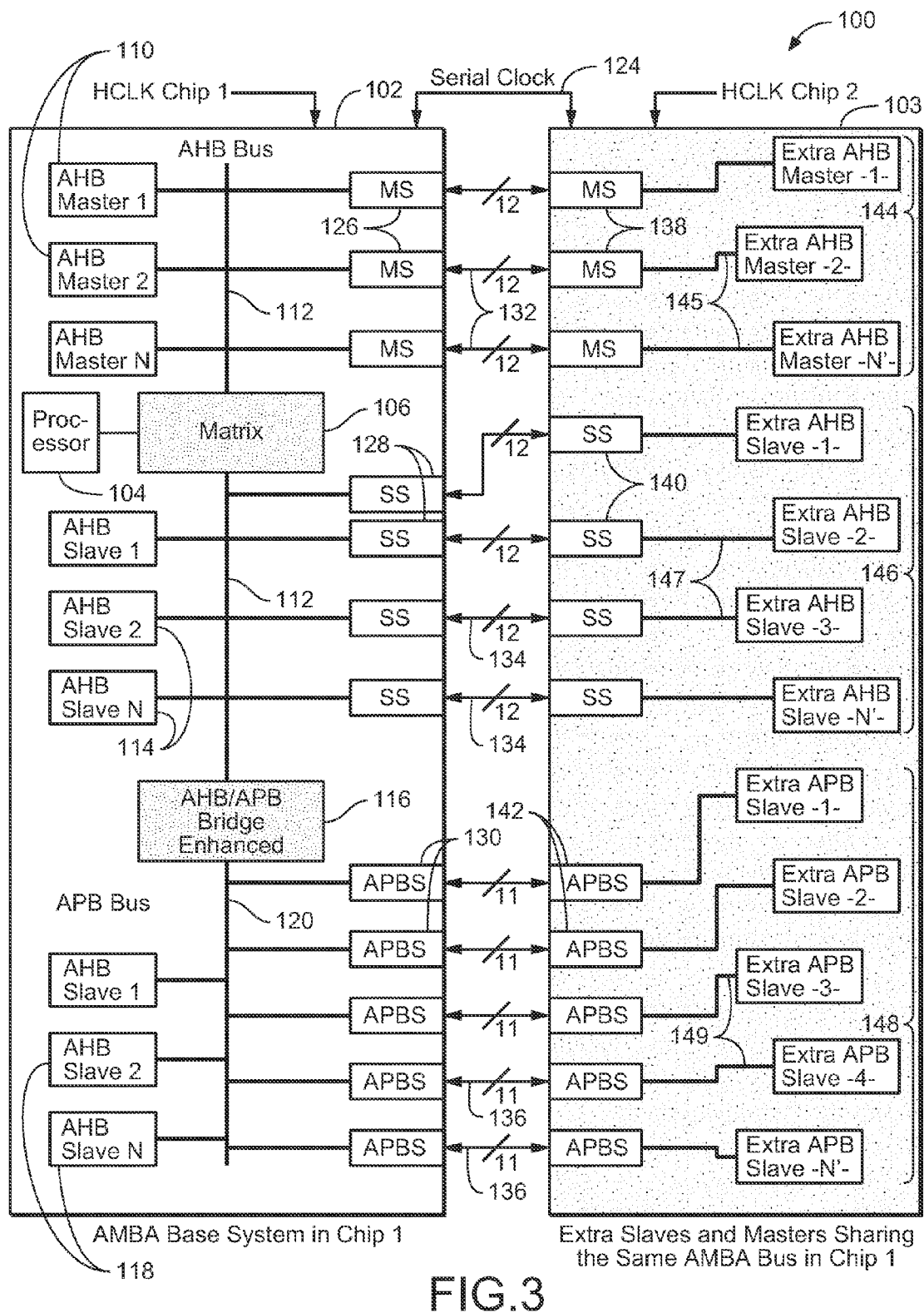
FIG. 3 is a block diagram of a multi-chip system of the present invention.

FIG. 3 is a block diagram of a multi-chip system on a chip (SoC) 100 of the present invention. System 100 can be provided on any suitable board, platform or substrate which can accommodate multiple devices (devices such as integrated circuit chips or similar devices) and connections between them. In the example embodiment of FIG. 3, system 100 includes two chips, chip 102 and chip 103, over which the system 100 is distributed and which are connected via multiple communication buses. For example, the present invention can be used to prototype an AMBA-Bus system on a development board, using as a reference a base system chip (chip 102 in the example of FIG. 3) including the main components, and adding extra master and/or slave peripherals in one or more different devices (chip 103 in the example of FIG. 3). Other embodiments of the system 100 can distribute components differently over the different devices, and/or include additional devices as required by the desired application.

System 100 includes a processor 104 and a matrix 106. Processor 104 can be any suitable controller, such as one or more microprocessors, application-specific integrated circuits (ASICs), digital signal processors (DSPs), etc. The processor 104 is coupled to the matrix 106, which provides a communication architecture that connects the various slaves and masters of the SoC system to each other, allowing them to communicate. The matrix 106 generates control signals based on the governing protocol timing, such as AHB protocol timing in the example shown. Matrix 106 typically includes multiple buses provided in parallel, each of which can support high bandwidth information streams. The matrix 106 can handle communications, including holding incoming transfers for receiving slaves and generating select signals for slaves. The matrix 106 can select which signals from masters are sent to a slave, and which signals from slaves are sent to a master. The matrix 106 can handle simultaneous requests from multiple masters to a particular slave by selecting the master that will access that slave.

The matrix 106 is connected to various multiple masters and slaves. These masters and slaves can be various electronic devices and components. Herein, masters and slaves are collectively called "peripherals." In the example of FIG. 3, there are several masters and slaves included on the same chip 102 as the processor 104 and matrix 106, allowing a complete system on chip 102. These include AHB masters 110, which are connected to the matrix 106 by an AHB bus 112. Also included on chip 102 are AHB slaves 114, which are connected to the matrix by the AHB bus 112.

An AHB/APB bridge 116 can be included on chip 102 to allow interfacing from an AHB matrix to APB devices. The bridge 116 is coupled to the matrix 106 by the AHB bus 112, and is connected to APB slaves 118 on the chip 102 by an APB bus 120.

Several other buses and their connections are provided on chip 102, which are intended to be connected to other, extra master and slave devices on other chips, such as chip 103. Chip 103 includes extra peripherals which can communicate with other peripherals of the system, including extra master and slave devices. According to the present invention, the connection buses between chips 102 and 103 are provided with serializers on chip 102 and chip 103 to greatly reduce the number of bus connections needed, thereby reducing the complexity and cost of the system 100. The serializers and deserializers of the present invention replace hundreds of connection lines in the communication to masters and slaves on other chips.

The serializers on chip 102 are of different types for different devices, and include master serializers (MSs) 126 connected to the AHB bus 112 and for use with AHB masters 110, slave serializers (SSs) 128 connected to the AHB bus 112 and for use with AHB slaves 114, and APB slave serializers (APBSs) 130 connected to the APB bus 120 and for use with APB slaves 118. Each type of serializer has a particular interface and components to control the appropriate timing for its associated bus and device. The serializers are generally described in greater detail with respect to FIG. 4.

Serialized information sent from a serializer 126, 128, or 130 is transmitted over an inter-chip communication bus to a serializer on the other chip 103. For the master serializers 126 the buses 132 are used, for the slave serializers 128 the buses 134 are used, and for the APB slave serializers 130 the buses 136 are used. These buses are shown in the example as each having only 11 or 12 lines, which compared to over 100 lines used in standard prior implementations, is a significant decrease in the number of lines. A serial clock 124 is used to govern the serial communication provided over the buses 132, 134, and 136.

On chip 103, similar serializers send and receive information over the buses 132, 134, and 136. Master serializers 138 send and receive signals on buses 132, slave serializers 140 send and receive signals on buses 134, and APBS serializers send and receive signals on buses 136. These serializers deserialize received signals and provide the deserialized signals to associated master or slave devices on chip 103 that are connected to the serializers. For example, serializers 138 provide signals to extra AHB masters 144 on buses 145, serializers 140 provide signals to extra AHB slaves 146 on buses 147, and serializers 142 provide signals to extra APB slaves 148 on buses 149.

Communications similar to those described above, but in the reverse direction, are performed when the peripherals on chip 103 send information back to the components provided on chip 102 over buses 132, 134, and 136.

The functions of the serializers, as well as other components of the system, can be implemented by program instructions of software which can be stored on a computer readable medium, such as memory, hard drive, other magnetic disk, optical disk (CD-ROM, DVD-ROM), etc. Alternatively, some or all of the functions can be implemented using hardware (logic gates, etc.), or a combination of software and hardware.

Figure 4:
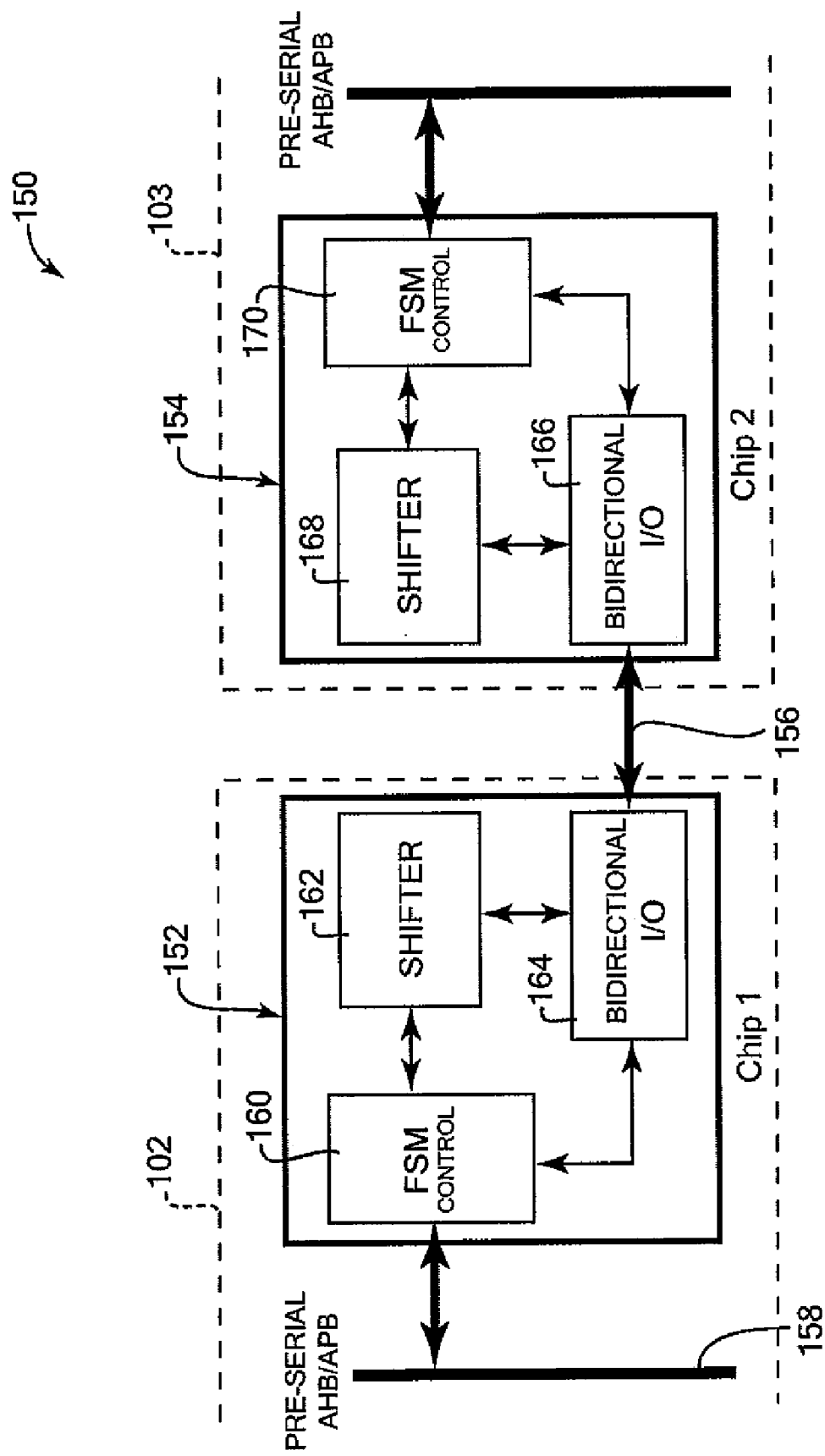
FIG. 4 is a block diagram illustrating a serializer system of the present invention.

FIG. 4 is a block diagram illustrating a serializer system 150 of the present invention. The serializers need to carefully comply with the used bus protocol timing (e.g., AMBA bus timing), so that the protocol is not violated. The serializer system 150 includes a serializer 152 and a serializer 154 which can communicate across a communication bus 156. In the example shown, serializer 152 is provided on chip 102 and serializer 154 is provided on chip 103, such that bus 156 is coupled between the two chips. Other configurations can be used in other embodiments.

In the example of FIG. 4, serializer 152 receives parallel information from a "pre-serial" AHB or APB bus 158, where the information is to be sent to the other chip 103. Serializer 152 includes a Finite State Machine (FSM) control block 160 which is used to control serial communication as well as introduce automatic wait cycles in the communication of information. These wait cycles are performed during the serialization process and last until a response has been received back from the addressed master or slave device.

The number of inserted automatic wait cycles depends on the ratio between the serial clock and HCLK frequencies. If the ratio of the serial clock and HCLK frequencies increases, the number of automatic wait cycles decreases. In one example embodiment, the number of automatic HCLK wait cycles can be approximated using the following relation:

WaitCycles=Tsync1+Treq+Pr+Tres+Tsync2 where Treq is the transfer request that requires 8 serial clocks, Tres is the transfer response that requires 8 serial clocks, Pr is the peripheral response having a variable number of clocks based on the particular peripheral, and Tsync1 and Tsync2 are the time to synchronize the serial clock and HCLK_left and HCLK_right, respectively, which is usually one HCLK cycle.

For example, if the serial clock has a frequency of 200 MHz, and the HCLKs have a frequency of 50 MHz, and the peripheral response Pr is 1 HCLK cycle, then Treq is equal to 8/(200/50) which is 2 HCLK cycles, and Tres is equal to 8/(200/50) which is 2 HCLK cycles. Thus the total wait cycles would be 1+2+1+2+1, or 7 HCLK cycles.

The FSM control block 160 provides the parallel information to a shifter 162 and receives parallel information from the shifter 162. The shifter is used to shift parallel information into serial form for transmission, or shift serial information into parallel form for reception. Transmitted serial information or received serial information is communicated from or to the shifter 162 via a bidirectional I/O block 164, which is connected to the communication bus 156. The FSM control block 160 also can send and receive some signals directly via the bi-directional I/O block 164.

The information serialized by the serializer 152 is sent across bus 156 to serializer 154, which in this example acts as a deserializer. The serializer 154 receives the information at a bi-directional I/O block 166, and provides the serialized information to a shifter 168 (and/or to FSM control 170). The shifter 168 provides deserialized (parallel) information to FSM control block 170, which provides the information to the post-serial AHB or APB bus (the same type of bus protocol that was used on the pre-serial end of the transmission). That bus provides the information to the addressed peripheral connected to the bus. Similarly, information from the peripherals on chip 103 is serialized, transmitted, and deserialized at chip 102.

In addition to the serializer components, an enhancement of the present invention to the AHB/APB bridge 116 allows the bridge to support wait cycles at the APB side of the system. The modifications to the AHB/APB bridge 116 are detailed below with respect to FIG. 26.

Each of serializers 152 and 154 has a particular interface and FSM control block to control the appropriate timing for its application. For example, the master serializers 126 can be AHB master serializers designed to interface AHB (or AHB-Lite) masters. All signals from the master are captured before the signals arrive to the bus matrix 106, and the serializer state machine inserts automatic wait cycles in order to keep the master waiting until a proper response occurs from the addressed slave. The slave serializers 128 can be AHB slave serializers designed to interface AHB (or AHB-Lite) slaves. All signals from the bus matrix 106 are captured before the signals arrive at the AHB slave, and the serializer state machine inserts automatic wait cycles in order to keep the matrix waiting until a proper response occurs from the addressed slave. The APBS serializers 130 are designed to interface the APB slaves. All signals from the AHB/APB bridge 116 are captured before they arrive at the APB slave, and the serializer state machine inserts automatic wait cycles in order to keep the bridge 116 waiting until a proper response occurs from the addressed slave. The details of each particular type of serializer are described below in association with the different applications, where the master serializers are described with reference to FIGS. 5A-12, the slave serializers are described with reference to FIGS. 13A-19, and the APB slave serializers are described with reference to FIGS. 20A-28B.

Figure 5A:
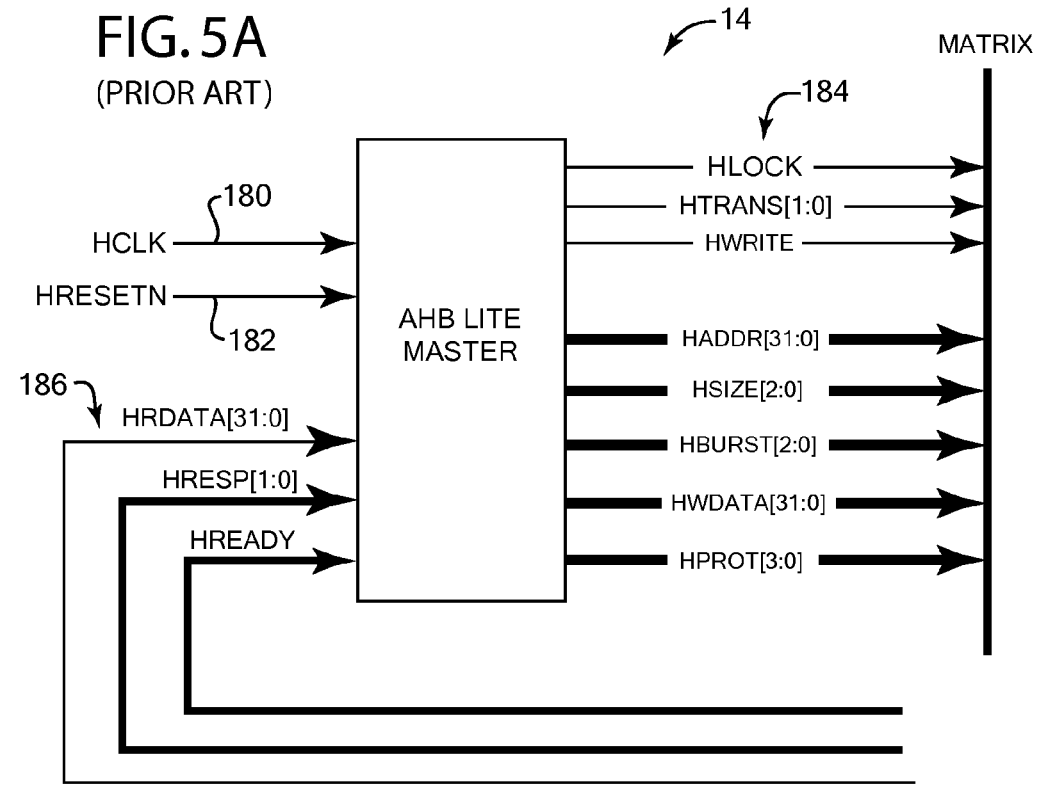
FIG. 5A is a block diagram illustrating a standard prior art AHB master and its interface.
Figure 5B:
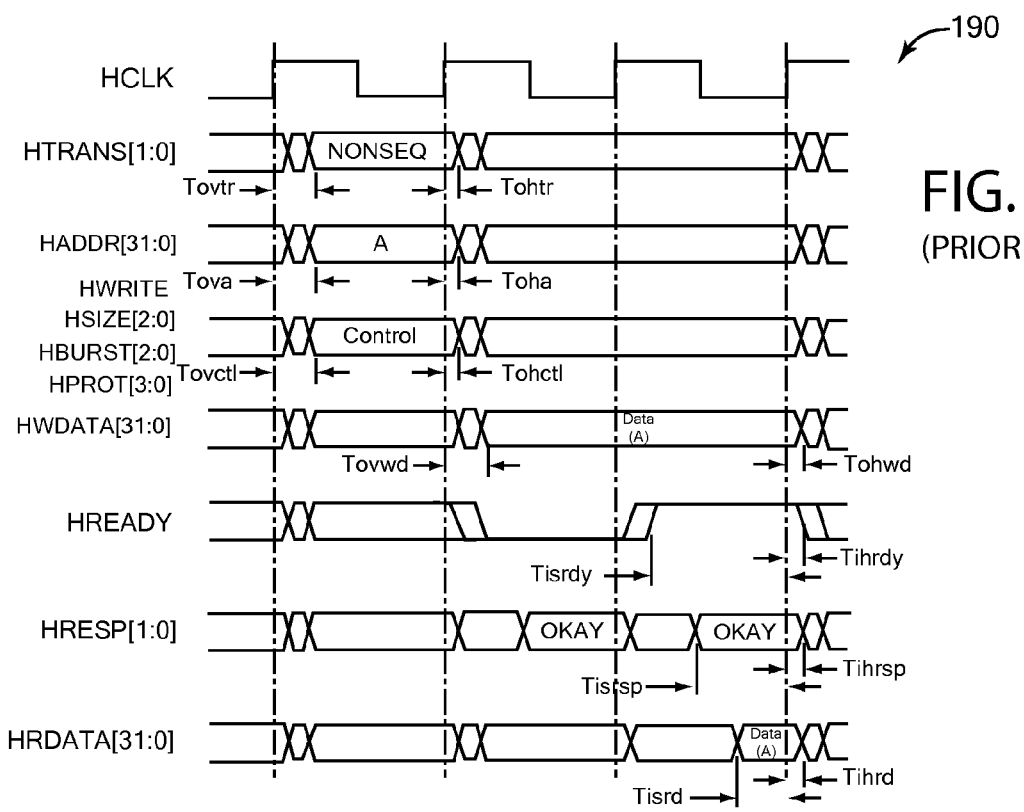
FIG. 5B is a timing diagram showing the timing of the signals provided in the master interface of FIG. 5A.

FIG. 5A is a block diagram illustrating a standard prior art AHB master device 14 and its interface. In FIG. 5A, an AHB-Lite master is shown as master 14. AHB master 14 starts all transfers to the AHB matrix 12. The interface required by the AHB-Lite master includes an HCLK signal 180 and HRESETN signal 182. The master provides the signals 184 to the AHB-Lite bus and thus to the matrix 12. The signals 184 include an address on bus HADDR and data on bus HWDATA. The AHB-Lite master 14 receives input signals 186 from the AHB-Lite bus, including data on bus HRDATA from a slave or other peripheral. FIG. 5B is a timing diagram 190 showing the timing of the signals provided in the master interface of FIG. 5A.

Figure 6:
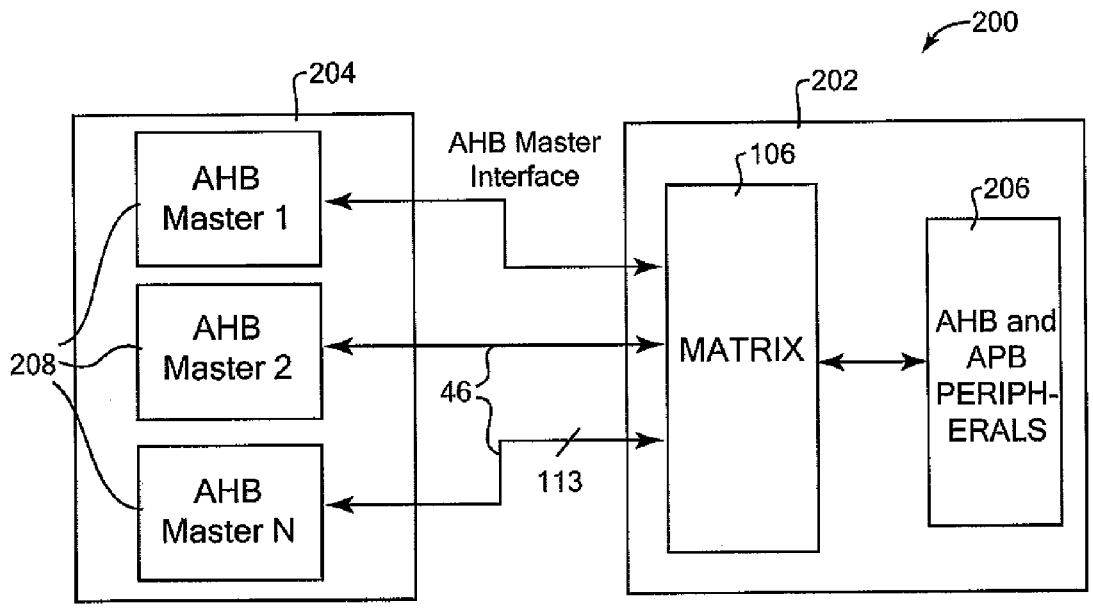
FIG. 6 is a block diagram showing a standard chip layout for AHB masters in a SoC of the prior art.

FIG. 6 is a block diagram showing a standard chip layout 200 for AHB masters in a SoC of the prior art. A first chip 202 includes an AHB matrix 12 and AHB and APB peripherals 206 which can communicate with the matrix. A second chip 204 includes a number of AHB masters 208. As shown, the prior art arrangement requires 113 communication lines in each bus 46 that connects a single AHB master between chip 204 and chip 202. If multiple masters are connected in this manner, as shown and which is commonly the case, the total number of communication lines needed increases greatly, which in turn increases the complexity and expense of the SoC.

Figure 7:
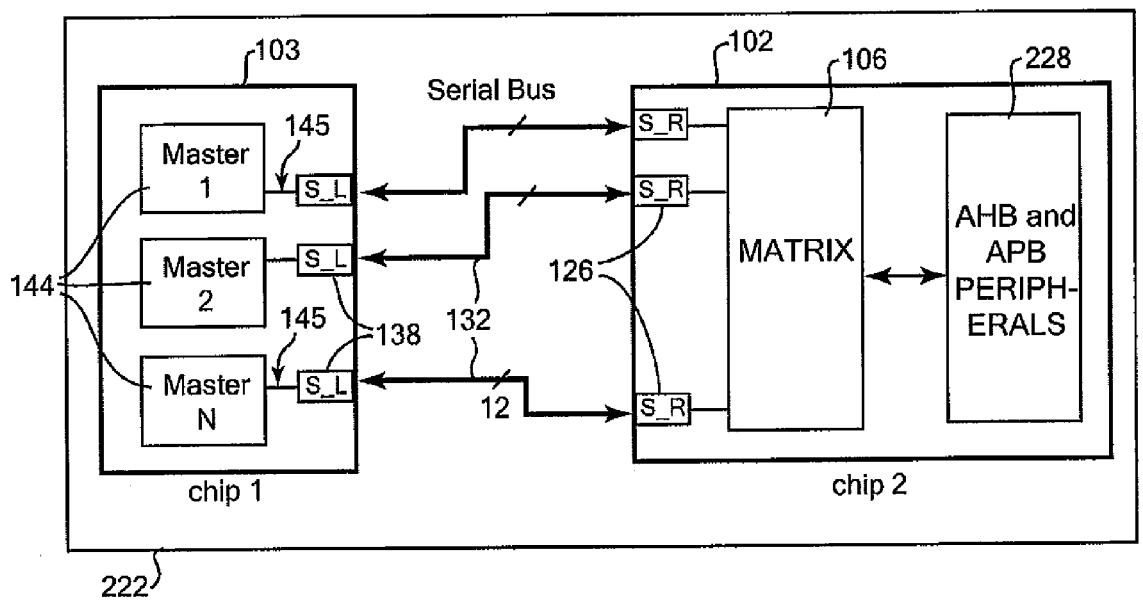
FIG. 7 is a block diagram of a chip layout system for inter-chip AHB masters in a SoC of the present invention.

FIG. 7 is a block diagram of a chip layout system 220 for inter-chip AHB masters in a SoC of the present invention. For example, chip layout system 220 can be provided on a board 222 or other suitable substrate or platform.

Board 222 includes first chip 102 and second chip 103 which is in communication with the first chip 102. The first chip 102 includes matrix 106 and AHB and APB peripherals 228. Peripherals 228 can include any components using the AHB and APB protocols, including AHB/APB bridge 116, masters and slaves on chip 102, one or more suitable controllers (microprocessors, application-specific integrated circuits (ASICs), digital signal processors (DSPs), etc.), and other suitable components.

According to the present invention, each bus provided via the matrix 106 that is to be connected to a master provided on a different chip, is connected to a master serializer (MS) 126. As described above, the master serializer 126 serializes information sent off chip and deserializes information being received from a different chip, as appropriate.

Chip 103 is also provided on board 222 and includes N masters 144 for use with the bus architecture and matrix 106 of chip 102. Masters 144 can be extra masters as shown above in FIG. 3, or required masters of the system, as appropriate. Each master 144 has a bus 145 which is to be connected to the other chip 102. In the system of the present invention, each bus 145 is connected to a master serializer 138, which is similar to the master serializers 126 provided on chip 102. Each master serializer 138 is coupled to an associated master serializer 126 by a communication bus 132. In the example shown, due to the serialization, only 12 lines are needed per bus, a significant reduction in required bus lines compared to other systems and methods. In the described embodiment, some of the communication channels are bi-directional, and thus allow the number of lines between the chips 102 and 103 to be minimized.

The method of the present invention is based on capturing all signals from a master 144 before the signals arrive at the matrix 106. The serializers use simple fully-synchronous high-speed shift registers to serialize information between the master 144 and the matrix 106. In order to achieve the serialization and maintain synchronization between a AHB-Lite master 144 and the matrix 106, a state machine is used to take care of the capture and reproduction of all master transfers along with the proper control and wait states. The state machine in a serializer 138 will insert automatic wait cycles in order to keep the master 144 waiting until a proper response occurs from the addressed slave over the appropriate connection bus 132. These operations are described in greater detail below with respect to FIG. 8.

Figure 8:
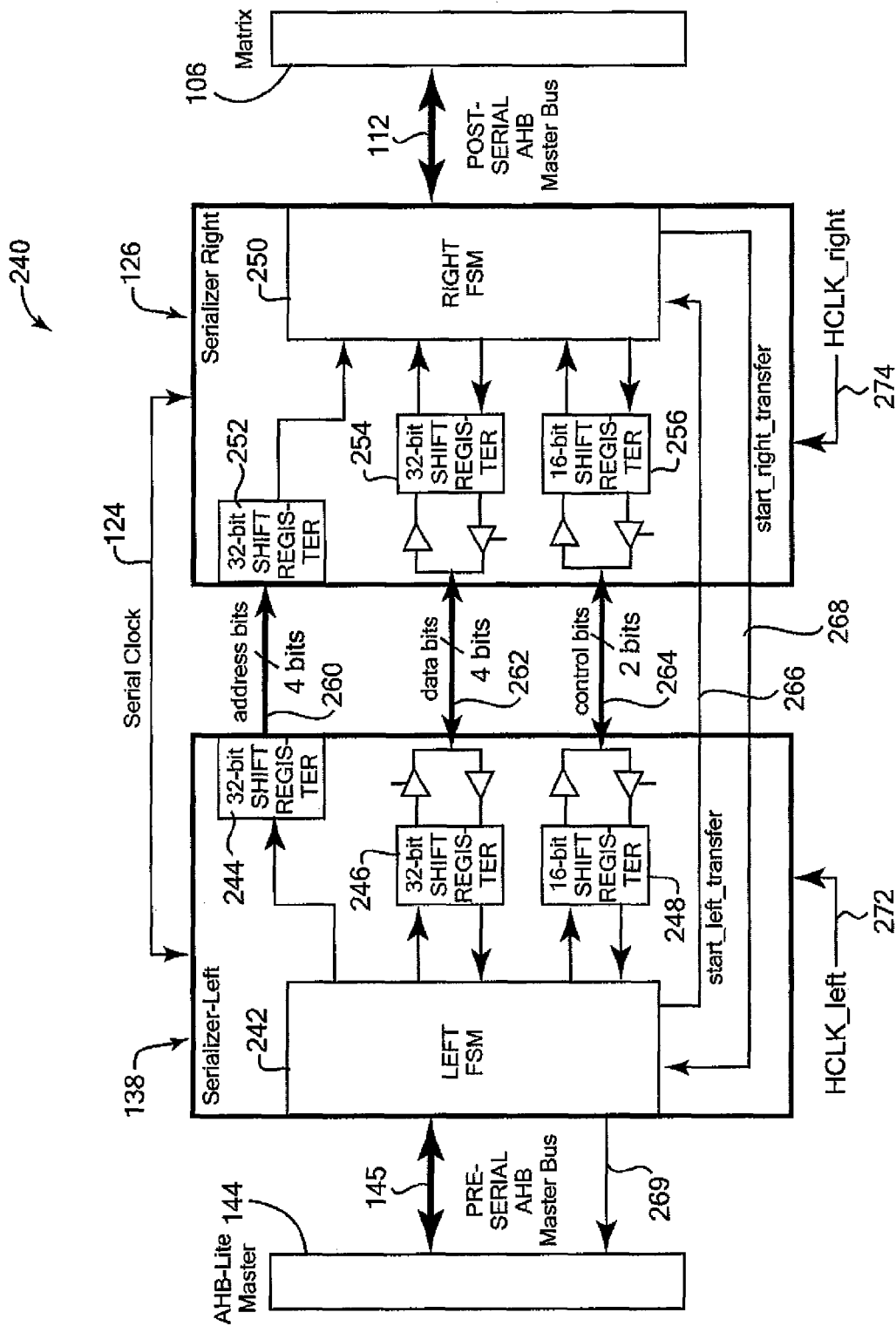
FIG. 8 is a block diagram illustrating an example embodiment of master serializers of the present invention in an interface between a master and matrix.

FIG. 8 is a block diagram illustrating an example embodiment 240 of the master serializers 126 and 138 of the present invention in an interface between a master 144 and matrix 106. In the example shown, serializer 138 includes a Left finite state machine (FSM) 242, two 32-bit shift registers 244 and 246, and a 16-bit shift register 248. The FSM 242 controls the operation of the serializer and introduces wait states to the master 144. This is described in greater detail below with respect to FIG. 9. In other embodiments, other controllers besides a finite state machine can be used. The two 32-bit shift registers 244 and 246 are used to serialize and deserialize information for the address bus and data bus. The 16-bit shift register 248 is used to serialize and deserialize the control signals used in the protocol. (There is no buffer for shift register 244 (and other similar shift registers in the examples described below) because it is uni-directional in the described embodiment.) Shift registers of other bit widths can be used in other embodiments as appropriate. The components and operation of shift registers 244, 246, and 248 are described in greater detail with respect to FIG. 10.

Similarly, serializer 126 includes a Right finite state machine (FSM) 250, two 32-bit shift registers 252 and 254, and a 16-bit shift register 256. The FSM 250 controls the operation of the serializer 126 as described in greater detail below with respect to FIG. 11. The two 32-bit shift registers 252 and 254 are used to deserialize and serialize information for the address bus and data bus, and the 16-bit shift register 256 is used to deserialize and serialize the control signals used in the protocol. Shift registers of other bit widths can be used in other embodiments as appropriate. The components and operation of shift registers 252, 254, and 256 are described in greater detail with respect to FIG. 10.

Shift register 244 is connected to shift register 252 by an address bus 260, which is 4 bits wide in the described embodiment and can be uni-directional to allow the master 144 to address a slave (the master 144 does not need to receive addresses). Shift register 246 is connected to shift register 254 by a bi-directional data bus 262 which is 4 bits wide in the described embodiment, and shift register 248 is connected to shift register 256 by a bi-directional control bus 264 which is 2 bits wide in the described embodiment. In addition, a start_left_transfer signal 266 is used by the Left FSM 242 to select a transfer of information from master to matrix, and a start_right_transfer signal 268 is used by the Right FSM 250 to select a transfer of information from matrix to master. These signals can be sent between the serializers via dedicated lines. The Left FSM 242 can also selectively set an HREADY signal 269 which is sent back to the master 144 to introduce wait states. Serial clock signal 124 is provided to both the serializers 138 and 126 to coordinate their functions of serial communication. The use of these signals is described in greater detail with respect to FIGS. 9 and 11.

HCLK signals 272 and 274 are provided to the serializers 138 and 126, respectively, and are the chip clocks for the chips 102 or 103 on which the serializers are provided. HCLK_left and HCLK_right signals can be different or the same frequency, depending on the desired frequency for that chip. In the described embodiments, they are considered to have the same frequency. Since the control for the shift registers is provided by the FSMs 242 and 250, the re-synchronized clock HCLK is needed to perform all operations. (The serial clock governs the shift register shifting and serial communication, while the HCLK signals govern communication to the master, slave, or matrix.) The serial clock 124 must be greater in frequency than each of the HCLK signals in order to keep good synchronization between both the HCLK and serial clock domains.

Figure 9:
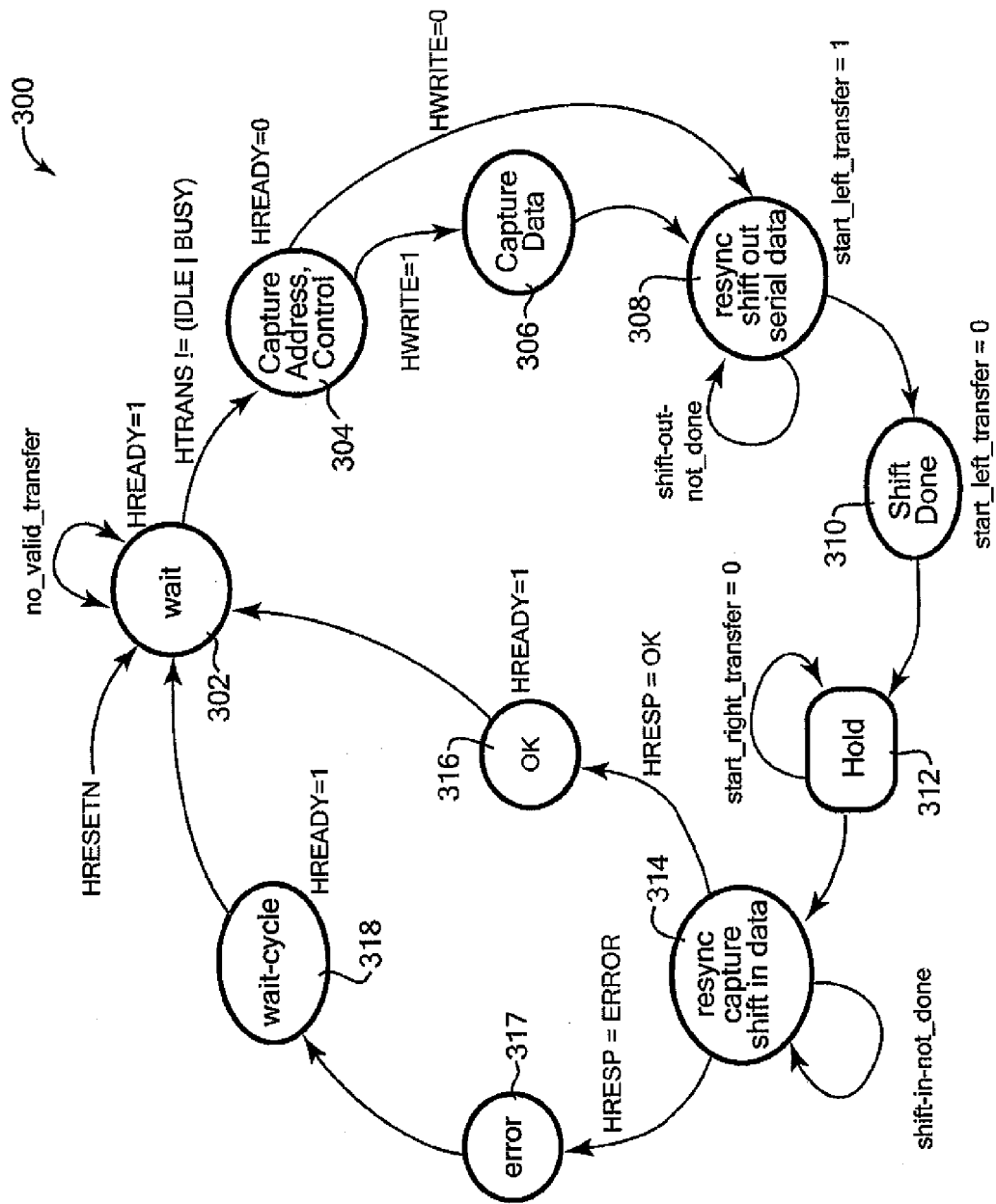
FIG. 9 is a flow diagram illustrating an example method or states of operation of the left finite state machine of the master serializer on the chip of the master.

FIG. 9 is a flow diagram illustrating an example method 300 or states of operation of the Left FSM 242 of the master serializer 138, provided on the chip 103 of the master 144. Left FSM 242 controls the serialization and deserialization of information, and also inserts automatic wait cycles, allowing the serialization procedure to be executed while adhering to the bus protocol. The FSM controls all the timing, and re-synchronizes information based on HCLK_Left to the serial clock domain "serial_clk" for serial transmission. This synchronization should occur on both sides (Left and Right) of the serial communication bus to provide a synchronous high speed serial transfer.

As shown at step 302, the FSM 242 waits until a valid transfer occurs from the master 144. If there is no valid transfer, the FSM continues to wait. If the main system reset signal HRESETN to the master 144 is asserted by an external source (such as a Reset-Controller on the chip, or a source external to the chip), this forces the FSM 242 to enter the wait state step 302. The HREADY signal 269 is set high by the FSM in this state.

A valid transfer is indicated by the HTRANS signal not being idle or busy. Once this occurs and a valid transfer is provided from the master 144, the FSM enters step 304, in which the address and control signals from the master are captured. Also, the HREADY signal 269 to the master 144 is set low to introduce wait cycle(s) to the master 144 This HREADY signal is initiated by the FSM and mimics a normal HREADY signal provided from a slave or matrix (which would cause the master to wait for the slave to respond to a request). If the HWRITE signal is low, then the master has initiated a reading operation and has not sent data signals, so the FSM enters step 308, described below. If the HWRITE signal is 1, then it is a write operation and at step 306 the FSM captures the data information which the master wishes to write, then proceeds to step 308.

At step 308, the FSM 242 resynchronizes the shifting out of serial information according to the serial clock signal 124, loads the appropriate shift registers 244, 246, and 248 according to the type of operation (read or write), and starts the transfer of information over the appropriate buses 260, 262, and/or 264. The Left FSM 242 also sets the signal 266 (start_left_transfer) high, which allows the Right FSM 250 to start capturing the synchronous incoming information. The Left FSM 242 also holds the HREADY signal 269 low, which causes the master 144 to wait; in this way, the FSM 242 inserts automatic wait cycles.

Once the shifting is complete, the process continues at step 310, where the start_left_transfer signal 266 is set to zero. The FSM then at step 312 waits for a response from the matrix 106 in a HOLD state while the start_right_transfer signal 268 is zero. The Right FSM sets the start_right_transfer signal 268 high when it wishes to send a response signal to the Left FSM. When signal 268 goes high, the process continues to step 314, where the Left FSM 242 shifts in serial information received from the serial bus into parallel form, and continues the shifting until the information is all received. The FSM 242 resynchronizes the incoming information from the high speed shift registers to the HCLK_left clock domain. The FSM 242 also analyzes the HRESP signals from the matrix 106 to determine whether the operation was successful or whether an error occurred. If the HRESP signal indicates successful sending of information, then in step 316 the HREADY signal 269 is set high which informs the master 144 that the operation is complete and exits the wait cycle. The process then returns to step 302 to wait for another valid transfer from the master.

If the HRESP signal indicates an error in the received information in step 314, this is indicated in step 317 (e.g., standard error procedures can be initiated), and in step 318 the FSM 242 releases the HREADY signal to the master 144, similarly as in step 316, to cause the master to exit the wait cycle. The process then continues back to step 302 to wait for another valid transfer from the master.

Thus while the serialization is in progress (e.g., steps 304-314), the HREADY signal 269 is held low, which introduces a wait state to the master 144. After the response, the HREADY signal is released to become high, providing the response from the matrix 106 back to the master. (The HREADY signal 269 (or a separate HREADY signal, if implemented in that way) could be set low again or kept low by the addressed slave during the request operation if the addressed slave needs more time to respond to the master.)

Figure 10:
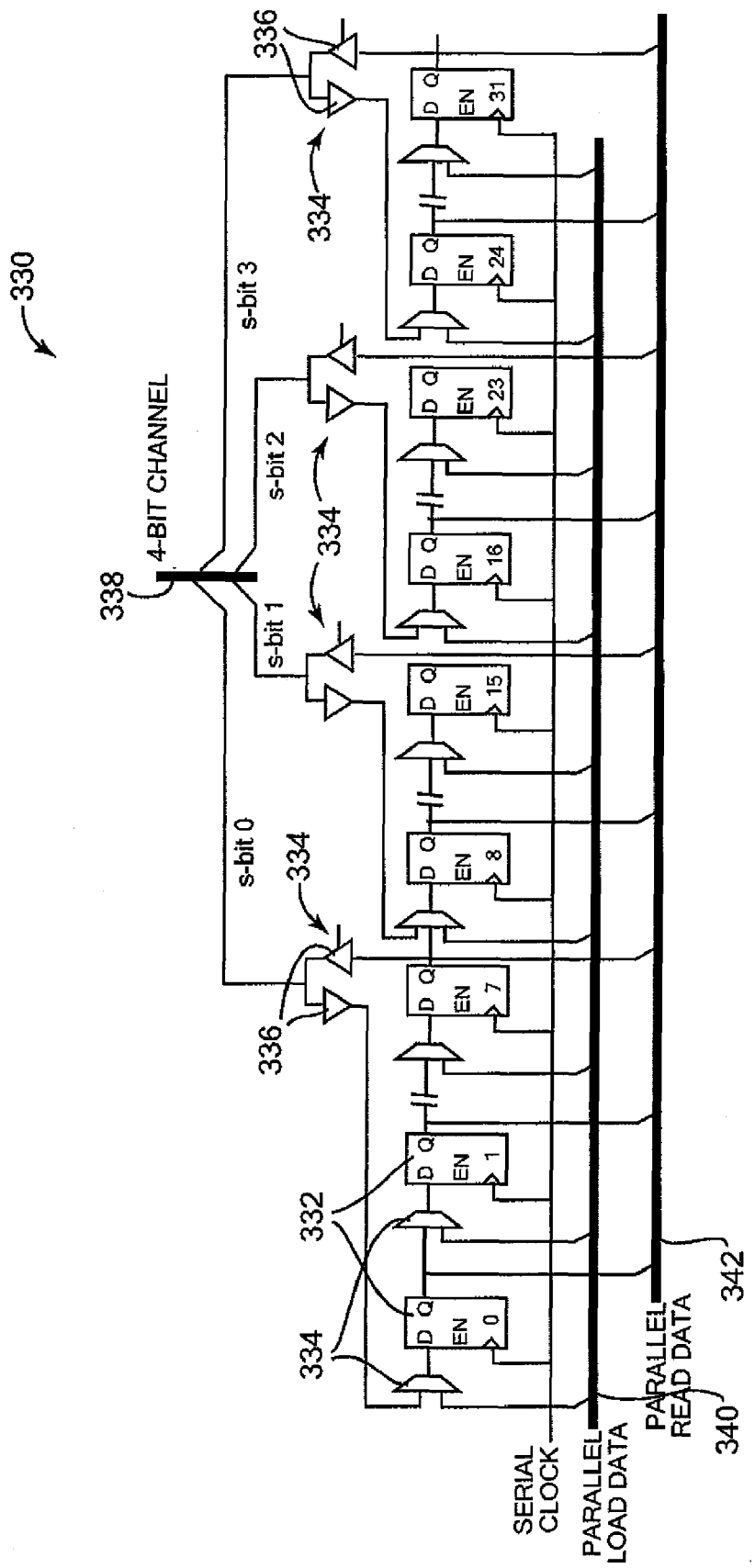
FIG. 10 is a schematic diagram illustrating an example embodiment of the synchronous shift registers of a serializer.

FIG. 10 is a schematic diagram illustrating an example embodiment 330 of the synchronous shift registers 244, 246, 248, 252, 254, and 256. The synchronous shift registers of the serializers include an array of flip-flops and several multiplexers to determine the information flow between them. In order to support bi-directional communication, the shift registers 246, 248, 254, and 256 (not 244 and 252 because they are uni-directional in the described embodiment) support features of serial information shift out, serial information shift in, parallel information load, and flip-flops with enable (to stop the shifting). The FSM 242 or 250 provides all control and timing to achieve the serialization and deserialization of the AHB-Lite master information.

An example 32-bit shift register 330 includes flip-flops 332 and multiplexers 334. In the described embodiment of FIG. 10, the 32-bit shift registers 244, 246, 252, and 254 each have a tap 334 (i.e., a bit position that affects the next state of the shift register) in the bits 7, 15, 23, and 31, as shown. The 16-bit shift registers 248 and 256 each have a tap in bits 7 and 15. Each tap in the shift register includes a bi-directional buffer 336, and a similar buffer is connected at the other end of the bus 260, 262, or 264 through a communication channel on the board (the channel 338 is shown to be 4 bits for the example 32-bit shift register 330). In the example shown, since the taps 334 are in groups of 8 registers, only 8 serial clock cycles are needed to transfer all information, independent of whether the shift register is 16 or 32 bits wide.

A shift-out procedure for the 32-bit registers operates as follows. Once information has been loaded in parallel mode from load parallel bus 340, then in the next 8 cycles all information will be shifted out in serial form. For example, line s-bit 0 shifts bits [7:0] out, s-bit 1 shifts bits [15:8] out, s-bit 3 shifts bits [23:16] out and s-bit 4 shifts bits [31:24] out. For a shift-in procedure, when information stars to be received and captured, line s-bit 0 feeds bit0 and shifts until bit7 is received, s-bit 1 feeds bit 8 and shifts until bit 15 is received, s-bit 2 feeds bit 16 and shifts until bit 23 is received, and s-bit 3 feeds bit 24 and shifts until bit 31 is received; the shifted bits are provided on read parallel bus 342. The 16-bit shift registers operate in the same manner, except only using two s-bit lines.

Figure 11:
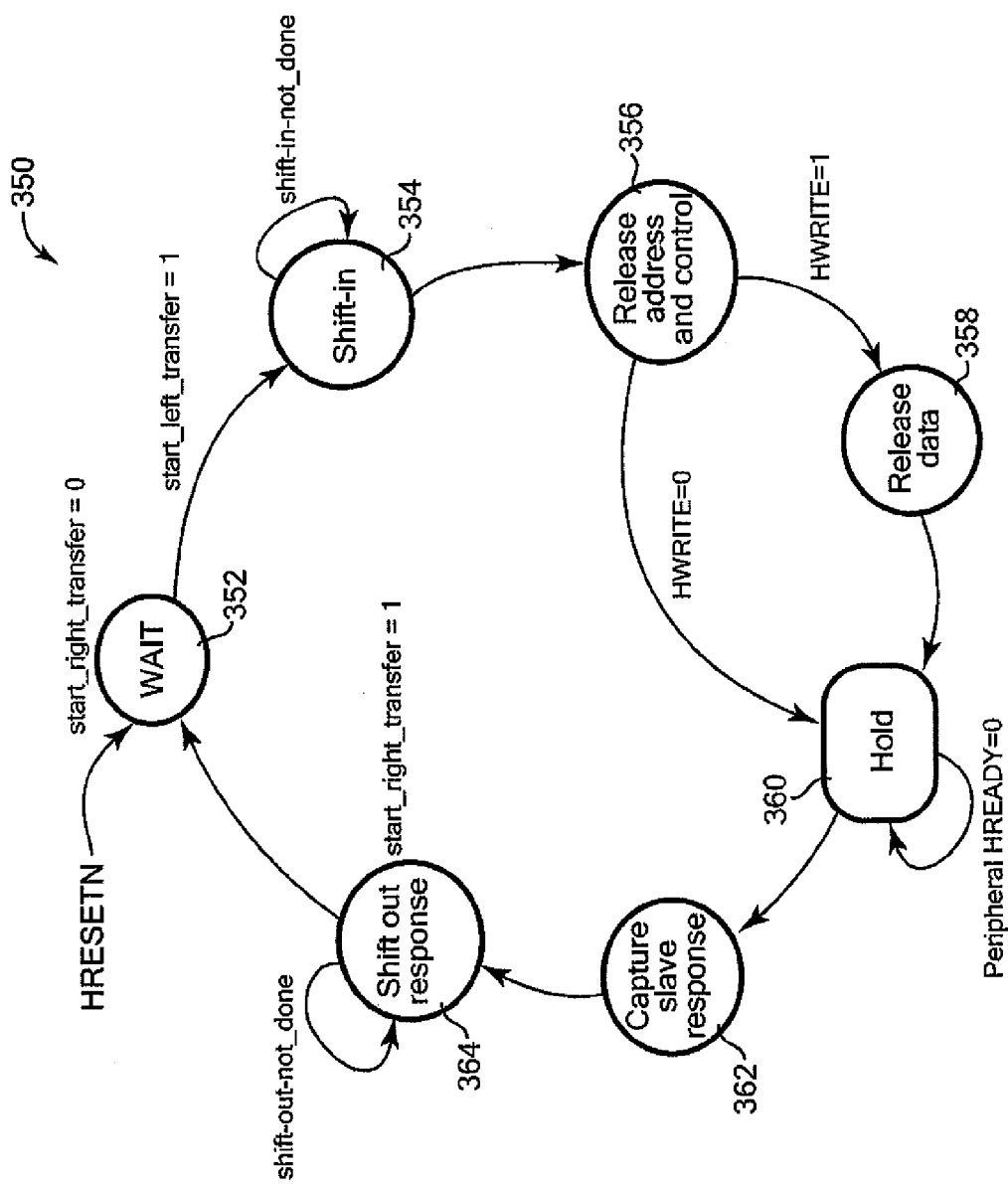
FIG. 11 is a flow diagram illustrating an example method or states of operation of the right finite state machine of the master serializer on the chip of the matrix.

FIG. 11 is a flow diagram illustrating an example method 350 or states of operation of the Right FSM 250 of the master serializer 126, provided on the chip 102 of the matrix 106. The Right FSM 250 is the complement of the system, and controls all timing and signals that talk to the matrix 106.

As shown at step 352, the Right FSM 250 waits while the start_left_transfer signal 266 is zero. If the HRESETN signal is asserted by an external source, this forces the FSM 250 to enter the wait state step 352. When the FSM 250 detects that the start_left_transfer signal 266 has been set to 1 by the Left FSM 242, the FSM 250 enters step 354, in which the Right FSM shifts in the received serialized information using the shift registers until the shifting is complete and the information is in parallel form. In next step 356, the received address and control signals are released to the matrix 106. If the HWRITE signal from the matrix 106 is high, then it is a write operation with data, and the FSM releases the captured data to the matrix 106 in step 358, and continues to step 360. If the HWRITE signal from the matrix is zero, it is a read operation having no data signals, and the process continues directly from step 356 to step 360.

In step 360, the FSM 250 waits in a hold state while the HREADY signal from the addressed peripheral (here, from the matrix 106) is zero. When that HREADY signal goes high, the addressed peripheral is ready to send its response, and the process captures the slave's response (routed via the matrix 106) in step 362. In next step 364, the FSM sets the start_right_transfer signal 268 to 1 to indicate to the Left FSM 242 that a response is forthcoming, and shifts out the response back to the other serializer 138 so that the master will receive the response. (The high HREADY signal from the matrix/slave can also be sent over the serial communication bus to serializer 138 in the Control bits, and the serializer 138 sends that high HREADY signal to the master to indicate the slave is ready to send its response, e.g., if a low HREADY signal was previously sent to the master 144 by the addressed slave.) The process then returns to step 352 to set start_right_transfer 268 low and wait for another transfer (the inserted automatic wait cycle is only provided on the left side of the serial communication, e.g., to the master 144.)

Figure 12:
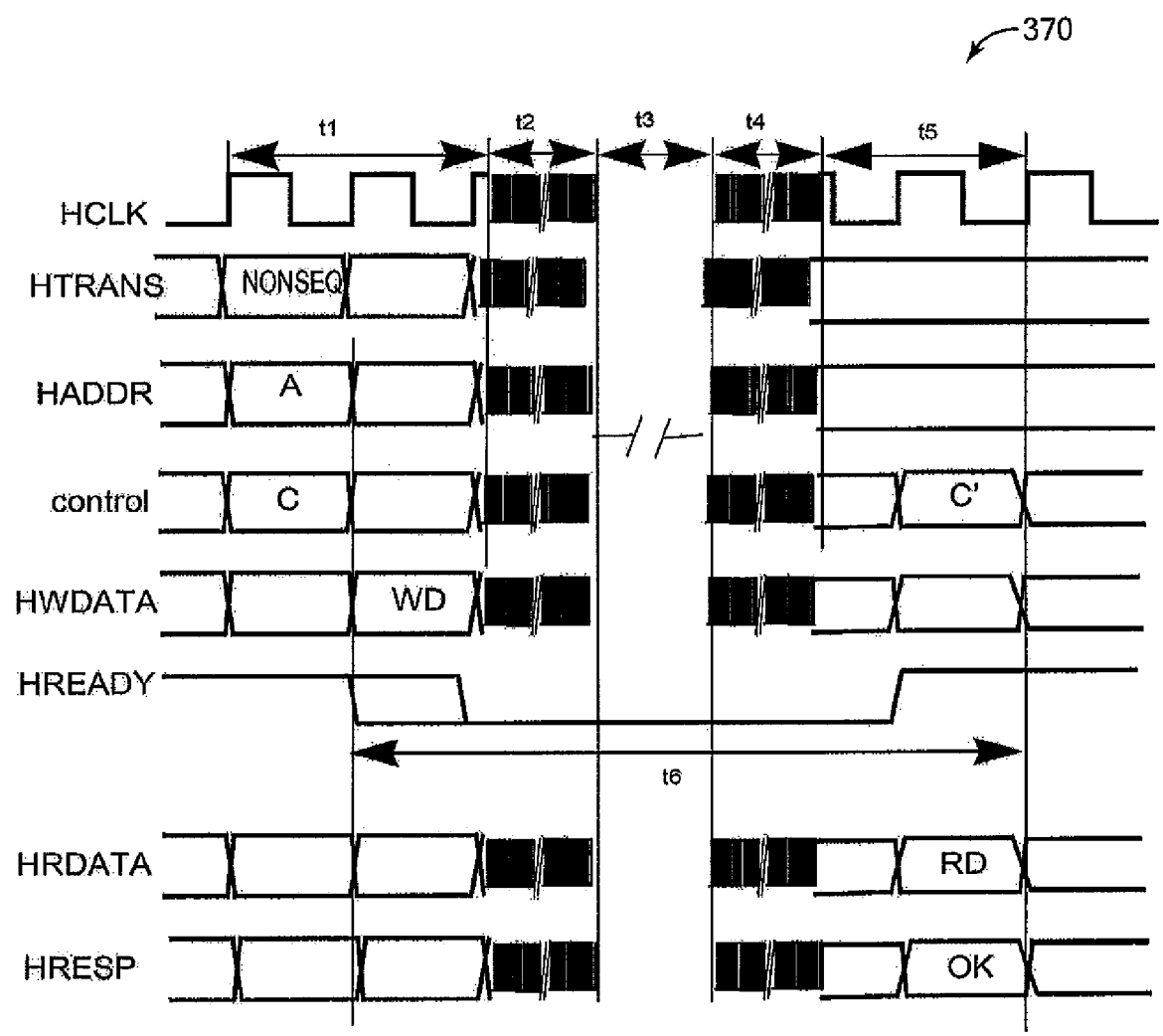
FIG. 12 is a timing diagram showing the timing for a transfer between a master and the matrix including the serialization of the present invention.

FIG. 12 is a timing diagram 370 showing the timing for a transfer between an AHB-Lite master 144 and the matrix 106 including the serialization of the present invention. In the diagram, time t1 is the time for a standard transfer. Time t2 is the time to capture and send serialized information to the matrix. Time t3 is the time to recover serial information and reproduce the operation at the matrix side. Time t4 is the time to transfer and recover the response from the matrix to the master. Time t5 is the time to reproduce the response to be presented to the master. Time t6 is the time during which wait cycles can be automatically inserted.

The number of automatic inserted wait cycles depends on the ratio of the serial clock 124 to the HCLK signals 272 and 274 (HCLK_left and HCLK_right are assumed to be the same frequency in these described examples). As the ratio is increased, the number of needed wait cycles decreases.

Figure 13A:
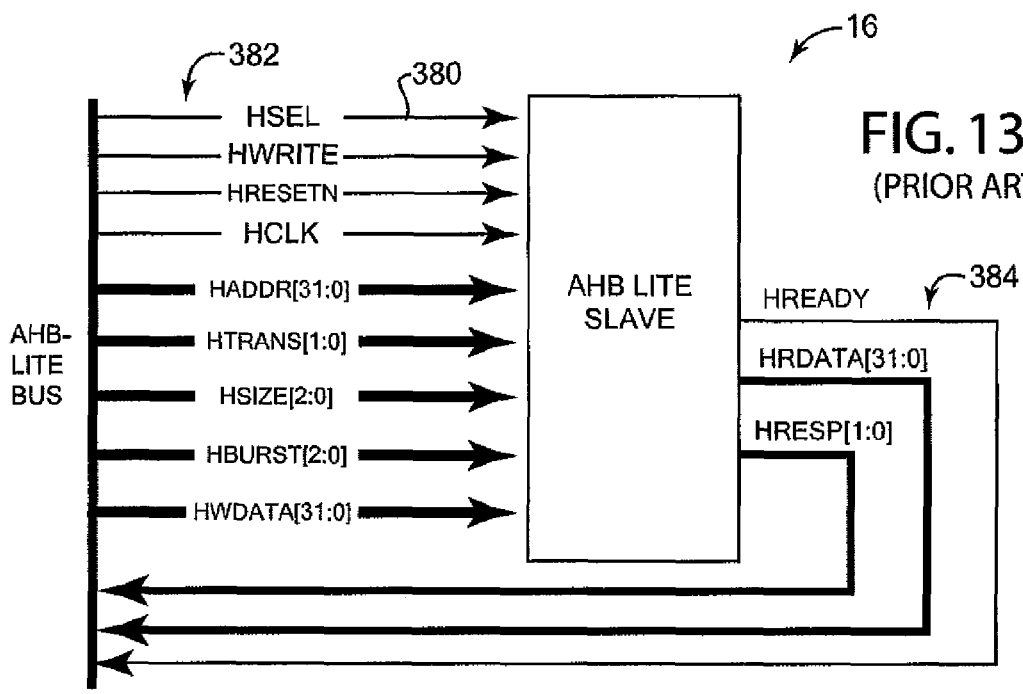
FIG. 13A is a block diagram illustrating a standard AHB slave and its interface.
Figure 13B:
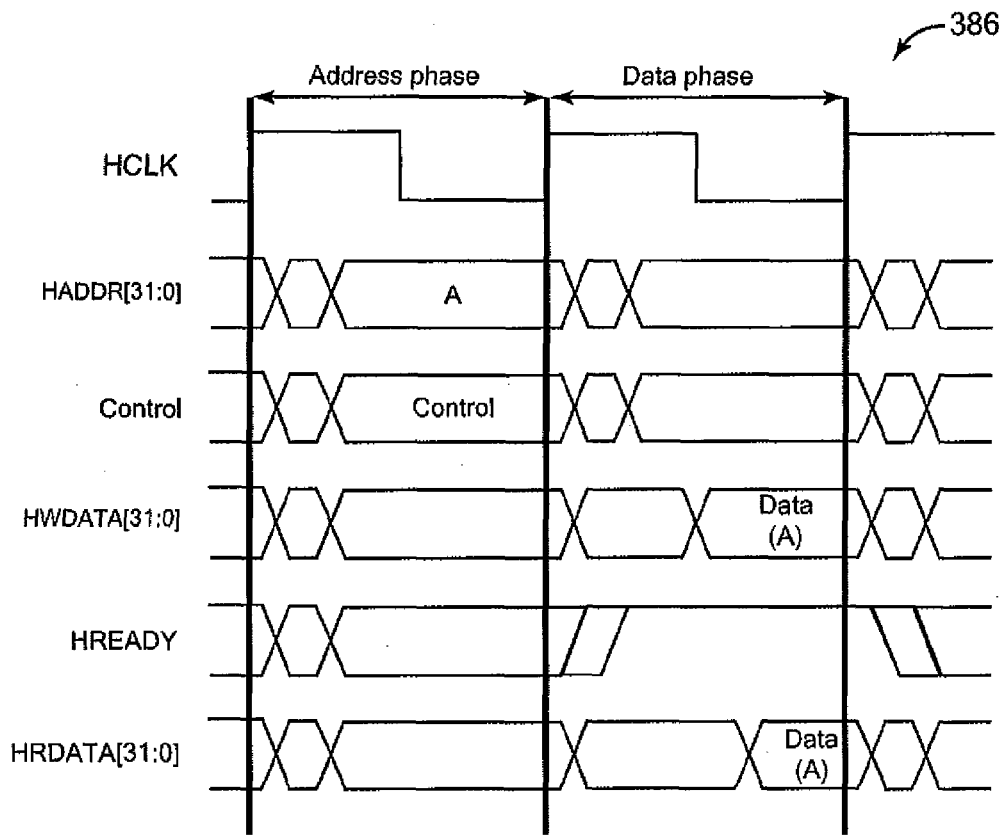
FIG. 13B is a timing diagram showing the timing of signals for a basic transfer for the AHB slave of FIG. 13A.

FIG. 13A is a block diagram illustrating a standard AHB slave 16 and its interface. In the example of FIG. 13A, an AHB-Lite slave is shown as slave 16. AHB-Lite slave 16 responds to transfers initiated by bus transfers connected to the AHB matrix 12. The interface required by the slave 16 includes control signals 382 provided from the AHB-Lite bus 32 which are generated by the matrix following the AHB protocol timing, except for a HSEL signal 380 used by the slave 16 as a select signal to determine when it should respond to a bus transfer. The AHB-Lite slave 16 provides output signals 384 back to the AHB-Lite bus, where they are provided to the AHB matrix 12. FIG. 13B is a timing diagram 386 showing the timing of signals for a basic transfer for the slave 16.

Figure 14:
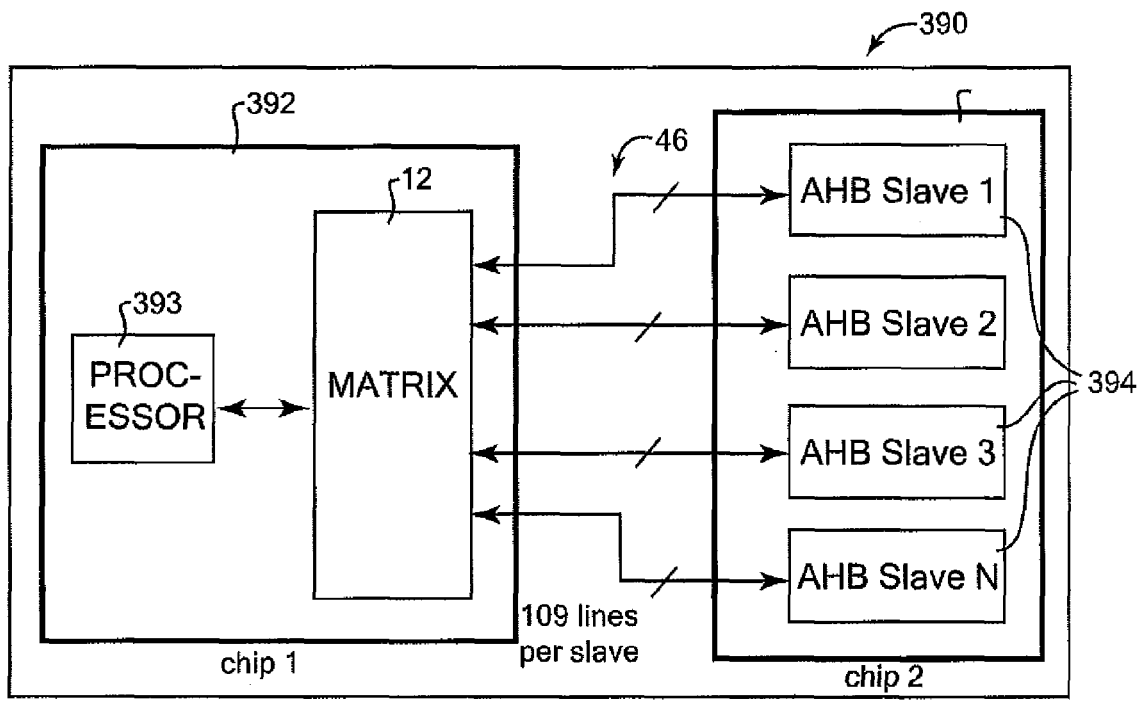
FIG. 14 is a block diagram of a standard chip layout for AHB slaves in a standard SoC of the prior art.

FIG. 14 is a block diagram showing a standard chip layout 390 for AHB slaves in a SoC of the prior art. On a development board 391, a first chip 392 includes an AHB matrix 12 and ARM processor 393 which can communicate with the matrix. A second chip 394 includes a number of AHB-Lite slaves 396. As shown, the prior art arrangement requires 109 communication lines (excluding HRESETN and HCLK signals) in each AHB bus 46 that connects a single AHB slave between chip 392 and chip 394. If multiple slaves are connected in this manner, as shown and which is commonly the case, the total number of communication lines needed increases greatly, which in turn increases the complexity and expense of the SoC.

Figure 15:
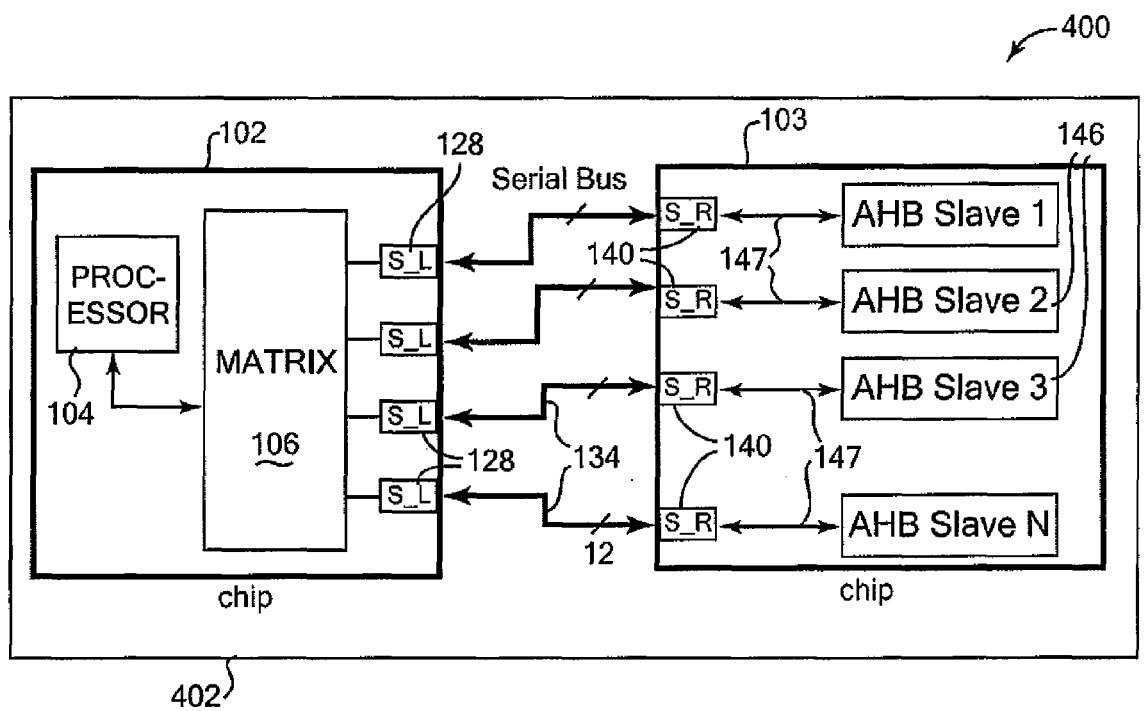
FIG. 15 is a block diagram of a chip layout system for inter-chip AHB slaves in a SoC of the present invention.

FIG. 15 is a block diagram of a chip layout system 400 for inter-chip AHB slaves in a SoC of the present invention. For example, chip layout system 400 can be provided on a board 402 or other suitable substrate or platform.

Board 402 includes first chip 102 and second chip 103 which is in communication with the first chip 102. The first chip 102 includes a processor 104 and a matrix 106. Processor 104 can be any suitable controller as described with respect to FIG. 3. The processor 104 is connected to matrix 106, which connects the slaves and masters of the system as described above. The AHB-Lite slaves are allowed to communicate with one or more masters in the system. The matrix 106 can generate select signals for slaves and select which signals from slaves are sent to a master, and also select the information to send to a slave.

According to the present invention, each bus provided via the matrix 106 that is to be connected to a slave provided on a different chip, is connected to a slave serializer (SS) 128. As described above, the slave serializer serializes information sent off chip or deserializes information being received from a different chip, as appropriate.

Chip 103 is also provided on board 402 and includes N AHB slaves 146 for use with the bus architecture and matrix 106 of chip 102. Slaves 146 can be extra slaves as shown above in FIG. 3, or the required slaves of the system, as appropriate. Each slave 146 has a bus 147 which is to be connected to the other chip 102. In the system of the present invention, each bus 147 is connected to a slave serializer 140, which is similar to the slave serializers 128 provided on chip 102. Each slave serializer 140 is coupled to an associated slave serializer 128 by a communication bus 134. In the example shown, due to the serialization, only 12 lines are needed per bus, a significant reduction in required bus lines compared to other systems and methods. In the described embodiment, some of the communication channels are bi-directional, and thus allow the number of lines between the chips 102 and 103 to be minimized.

The method of the present invention is based on capturing the signals intended to be sent to the AHB slave, and inserting wait states in order to comply with the AHB protocol until those signals are received by the slave 146 at the other end. An answer then is sent back from the slave with the appropriate response. The serializers use fully-synchronous high-speed shift registers to serialize information between the slave 146 and the matrix 106. In order to achieve the serialization and maintain synchronization between a AHB slave and the matrix, a state machine is used to take care of the capture and reproduction of all slave communications along with the proper control, timing, and wait states. These operations are described in greater detail below with respect to FIG. 16.

Figure 16:
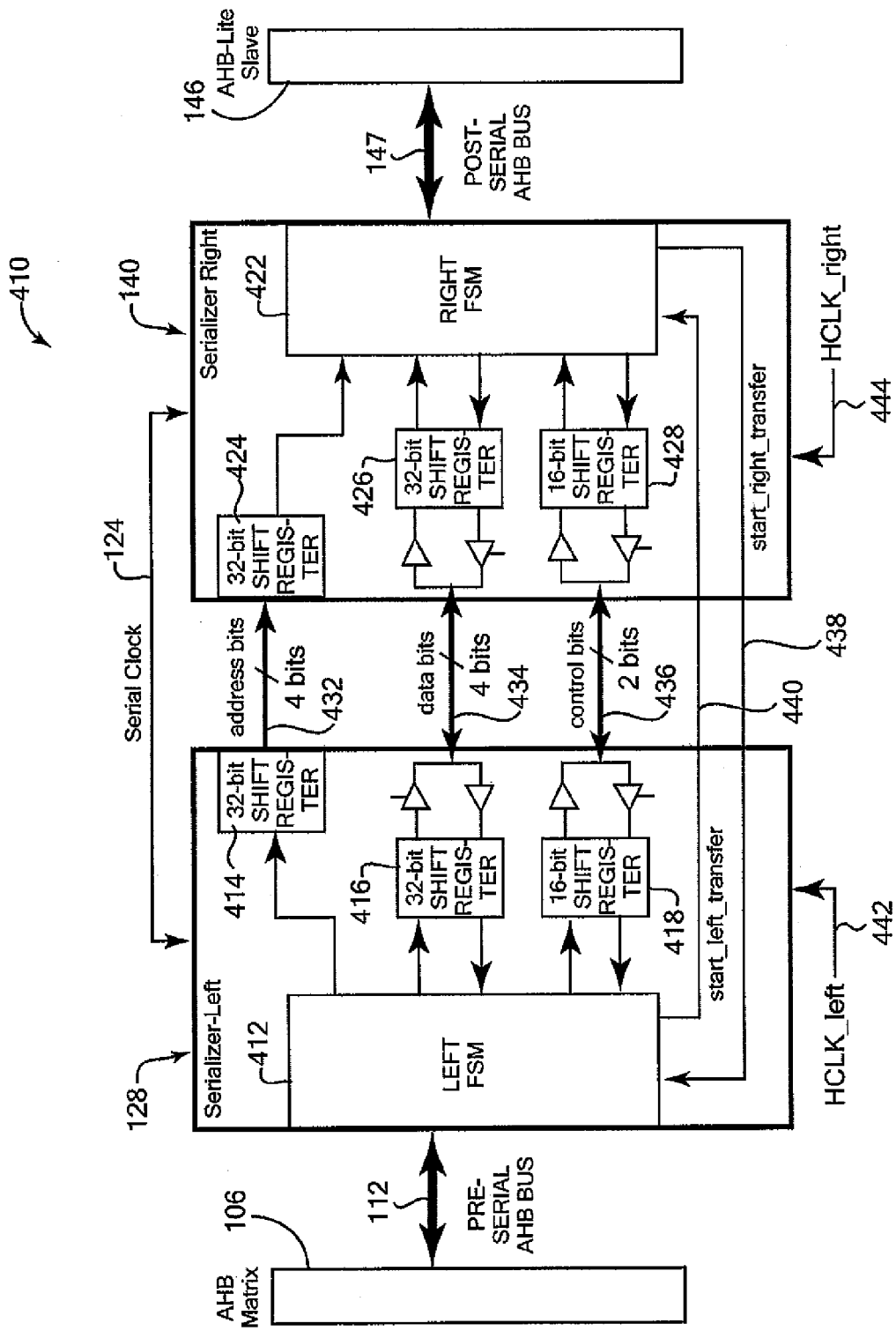
FIG. 16 is a block diagram illustrating an example embodiment of slave serializers of the present invention in an interface between an AHB slave and matrix.

FIG. 16 is a block diagram illustrating an example embodiment 410 of the slave serializers 128 and 140 of the present invention in an interface between an AHB slave 146 and matrix 106. In the example shown, serializer 128 includes a Left finite state machine (FSM) 412, two 32-bit shift registers 414 and 416, and a 16-bit shift register 418. The FSM 412 controls the operation of the serializer and introduces wait states to the matrix 106. This is described in greater detail below with respect to FIG. 17. In other embodiments, other controllers besides a finite state machine can be used. The two 32-bit shift registers 414 and 416 are used to serialize and deserialize information for the address bus and data bus. The 16-bit shift register 418 is used to serialize and deserialize the control signals used in the protocol. Shift registers of other bit widths can be used in other embodiments as appropriate.

Similarly, serializer 140 includes a Right finite state machine (FSM) 422, two 32-bit shift registers 424 and 426, and a 16-bit shift register 428. The FSM 422 controls the operation of the serializer 140 as described in greater detail below with respect to FIG. 18. The two 32-bit shift registers 424 and 426 are used to deserialize and serialize information for the address bus and data bus, and the 16-bit shift register 428 is used to deserialize and serialize the control signals used in the protocol. The synchronous shift registers of the serializers include an array of flip-flops and several multiplexers to determine the information flow between them, as well as buffers on the buses. One embodiment of the synchronous shift registers of the shift registers 414, 416, 418, 424, 426, and 428 includes components and operation similar to the operation of the shift registers 244, 246, 248, 252, 254, and 256, respectively, as described above with reference to FIGS. 8 and 10. There are no buffers provided on the output and input of registers 414 and 424 since these registers are unidirectional in the described embodiment.

Shift register 414 is connected to shift register 424 by an address bus 432, which is 4 bits wide in the example shown and can be uni-directional to allow the matrix 106 to address the slave 146 (the slave 146 does not need to send addresses). Shift register 416 is connected to shift register 426 by a bi-directional data bus 434 which is 4 bits wide in the example shown, and shift register 418 is connected to shift register 428 by a bidirectional control bus 436 which is 2 bits wide in the example shown. A start_left_transfer signal 438 is used by the Left FSM 412 to select a transfer of information from matrix to slave, and a start_right_transfer signal 440 is used by the Right FSM 422 to select a transfer of information from slave to matrix. These signals can be sent between the serializers via dedicated lines. Serial clock signal 124 is provided to both the serializers 128 and 140 to coordinate their functions of serial communication. The Left FSM 412 can also selectively set an HREADY signal 439 back to the matrix 106 to introduce wait states. The use of these signals is described in greater detail with respect to FIGS. 17 and 18.

HCLK signals 442 and 444 are provided to the serializers 128 and 140, respectively, and are the chip clocks for the chips 102 and 103 on which the serializers are provided. Since the control for the shift registers is provided by the FSMs 412 and 422, the re-synchronized clock HCLK is needed to perform all operations. The serial clock 124 must be greater in frequency than each of the HCLK signals in order to keep good synchronization between both the HCLK and serial clock domains.

Figure 17:
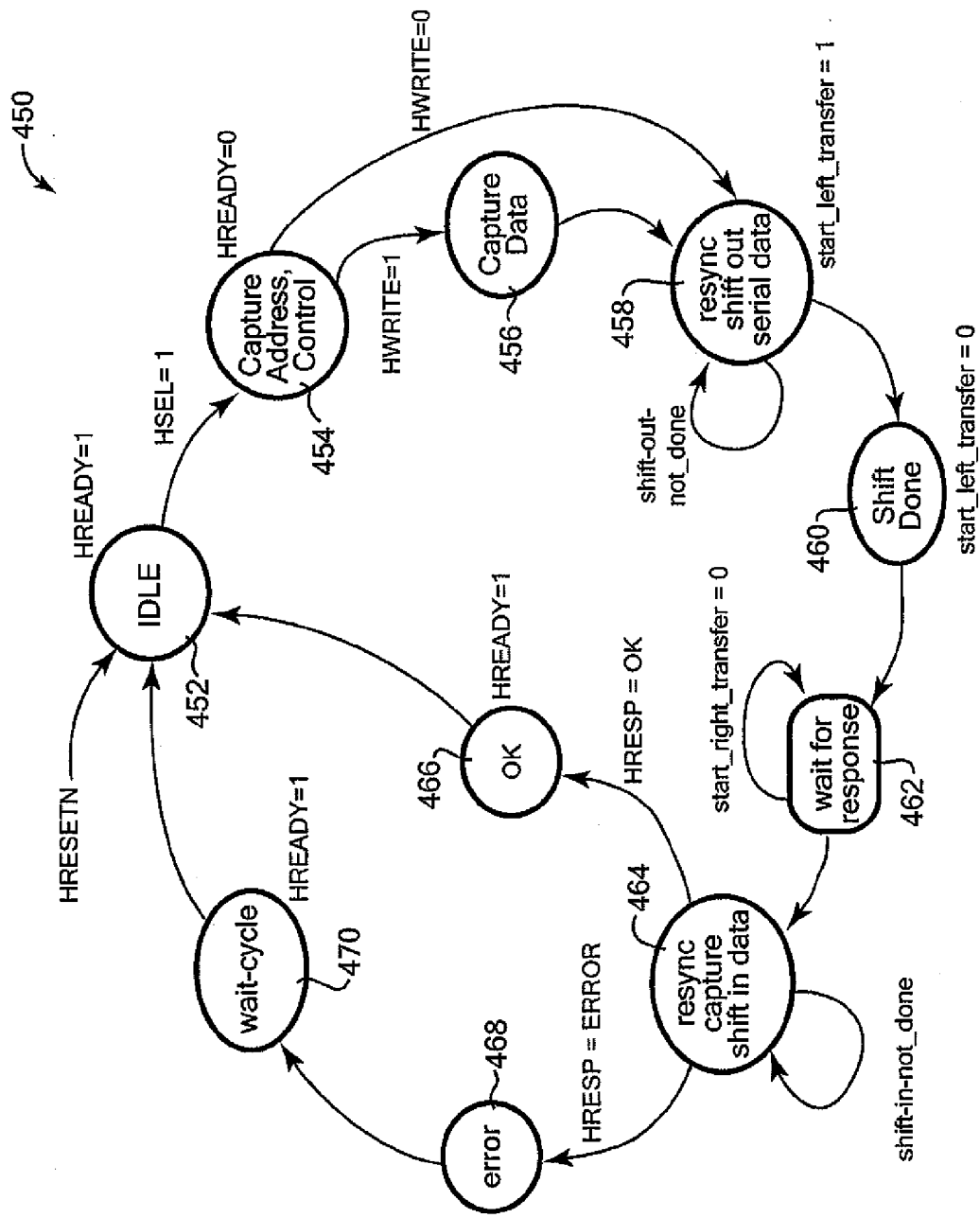
FIG. 17 is a flow diagram illustrating an example method or states of operation of the left finite state machine of the slave serializer on the chip of the matrix.

FIG. 17 is a flow diagram illustrating an example method 450 or states of operation of the Left FSM 412 of the slave serializer 128, provided on the chip 102 of the matrix 106.

Left FSM 412 controls and synchronizes all incoming information from the AHB bus, and inserts automatic wait states so that the AHB protocol does not get corrupted while the serializing process is in progress. The Left FSM 412 controls all the timing and re-synchronize information incoming from HCLK_left to the domain of serial clock 124. This allows both sides (Left and Right) to have a synchronous high speed serial transfer.

At step 452, the Left FSM 412 is idle, waiting for a transfer from the matrix 106. The HREADY signal 439 is set high in this state. If the reset signal HRESETN is asserted by an external source (e.g., a controller on the chip or source external to the chip), this forces the FSM 412 to enter the idle state 452. Once the HSEL signal is asserted as 1, which selects the slave 146 for a master's transfer, then the process continues to step 454, in which the FSM 412 captures the address and control information from the matrix. Also, the HREADY signal 439 (initiated by the FSM) is sent to the matrix 106 is set low to introduce automatic wait cycles in the matrix. If the HWRITE signal is set high, then it is a write operation, and the process continues to step 456 to capture the data signals from the matrix. If HWRITE is low, it is a reading operation and no data signals are captured from the matrix, and the process proceeds to step 458 from step 454.

At step 458, the FSM 412 resynchronizes the shifting out based on the serial clock signal 124, loads the appropriate shift registers 414, 416, and 418 and shifts out information in serialized form to the other serializer 140 on the appropriate serial buses 432, 434, and 436. The Left FSM 412 also sets the start_left_transfer signal 438 high, which allows the Right FSM 422 to start capturing the synchronous incoming serial information. The Left FSM 412 also holds the HREADY signal low, which causes insertion of automatic wait cycles in the matrix 106.

When the shifting out is complete, the process continues at step 460, where the start_left_transfer signal 438 is set to zero. At step 462, the FSM 412 waits for a response from the slave and Right side, which would be indicated by the Right side setting start_right_transfer to 1, indicating the Right side wishes to send a slave response back to the Left FSM 412. Once this occurs, the process continues to step 464 in which the FSM 412 shifts in serial information received from the serial bus into parallel form, and continues the shifting until all the information is received. The FSM 412 re-synchronizes the incoming information from the high speed shift registers to the HCLK_left clock domain. The FSM 412 also analyzes the HRESP signal from the slave 146 to determine whether the operation was successful or whether an error occurred. If the HRESP signal indicates successful sending of information, then in step 466 the HREADY signal 439 is set high, informing the matrix 106 that the operation is complete and exits the wait cycle. The process then returns to step 302 to wait for another valid transfer from the matrix.

If the HRESP signal indicates an error in the received information in step 464, this is indicated in step 468 (e.g., standard error procedures can be initiated), and in step 470 the FSM 412 releases the HREADY signal to the master 144, similarly as in step 316, to cause the master to exit the wait cycle. The process then continues back to step 452 to wait for another valid transfer from the matrix.

Thus while the serialization is in progress (e.g., steps 454-464), the HREADY signal 439 from the Left FSM 412 to the matrix 106 is held low, which introduces a wait state to the matrix 106. After the response, this HREADY signal is released to become high, providing the answer from the slave back to the matrix. (The HREADY signal 439 (or a separate HREADY signal, if implemented in that way) could be set low again or kept low by the addressed slave during the request operation if the addressed slave needs more time to respond to the master.)

Figure 18:
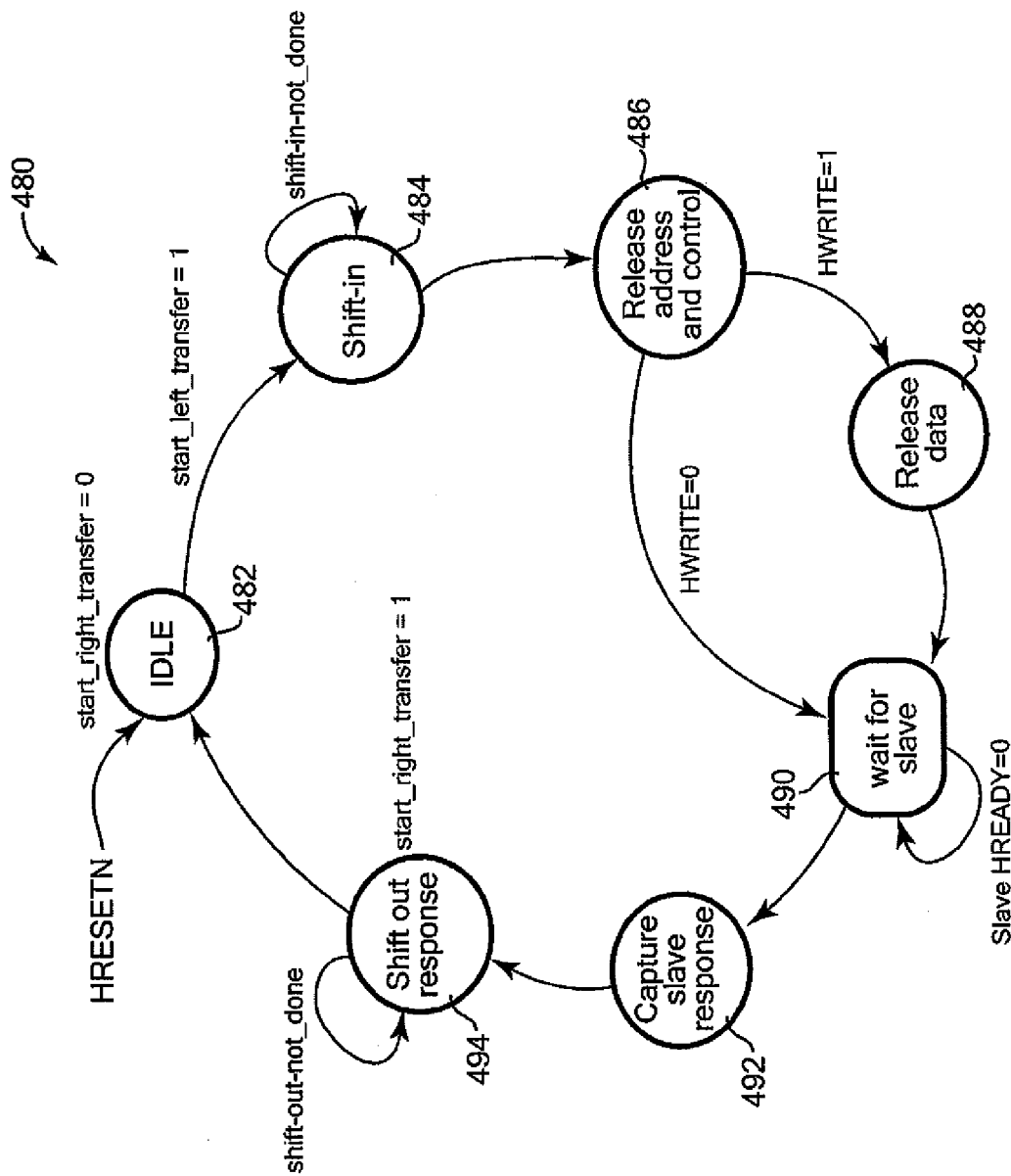
FIG. 18 is a flow diagram illustrating an example method or states of operation of the right finite state machine of the slave serializer on the chip of the slave.

FIG. 18 is a flow diagram illustrating an example method 480 of operation of the Right FSM 422 of the slave serializer 140, provided on the chip 103 of the slave 146. The Right FSM 422 is the complement of the system, and controls all timing and signals that talk to the slave 146. Operation is similar to that of the Right side FSM 126 as described above with reference to FIG. 11.

As shown at step 482, the FSM 442 waits until the start_left_transfer signal 440 is one. The HRESETN signal also forces the FSM 442 to enter the wait state step 482. When the start_left_transfer signal is set to 1 by the Left FSM 412, the Right FSM 422 enters step 484, in which the FSM 422 shifts in the serialized information from the serial bus using the shift registers, until complete and the information is in parallel form. In next step 486, the received address and control signals are released to the slave. If the HWRITE signal from the slave 146 is high, then it is a write operation with data, and the FSM 422 releases the data signals to the slave 146 in step 488, and the process continues to step 490. If the HWRITE signal from the slave is zero, then it is a read operation with no data signals and the process continues directly from step 486 to step 490.

In step 490, the FSM 422 waits in a hold state while the HREADY signal from the slave is zero. When that HREADY signal goes high, the slave is ready to send its response, and the process captures the slave's response in step 492. In next step 494, the FSM 422 sets the start_right_transfer signal 438 to 1 to indicate that a response from the slave is forthcoming, and shifts out the response back to the other serializer 128 so that the matrix will receive the response (and it can then be sent to the originating master). The process then returns to step 482 to set start_right_transfer low and wait for another transfer. (Similarly to the diagram of FIG. 11 above, the high HREADY signal from the slave is also sent over the serial communication bus to serializer 128 in the Control bits, and the serializer 128 sends that high HREADY signal to the matrix and requesting master to indicate the slave is ready to send its response.)

Figure 19:
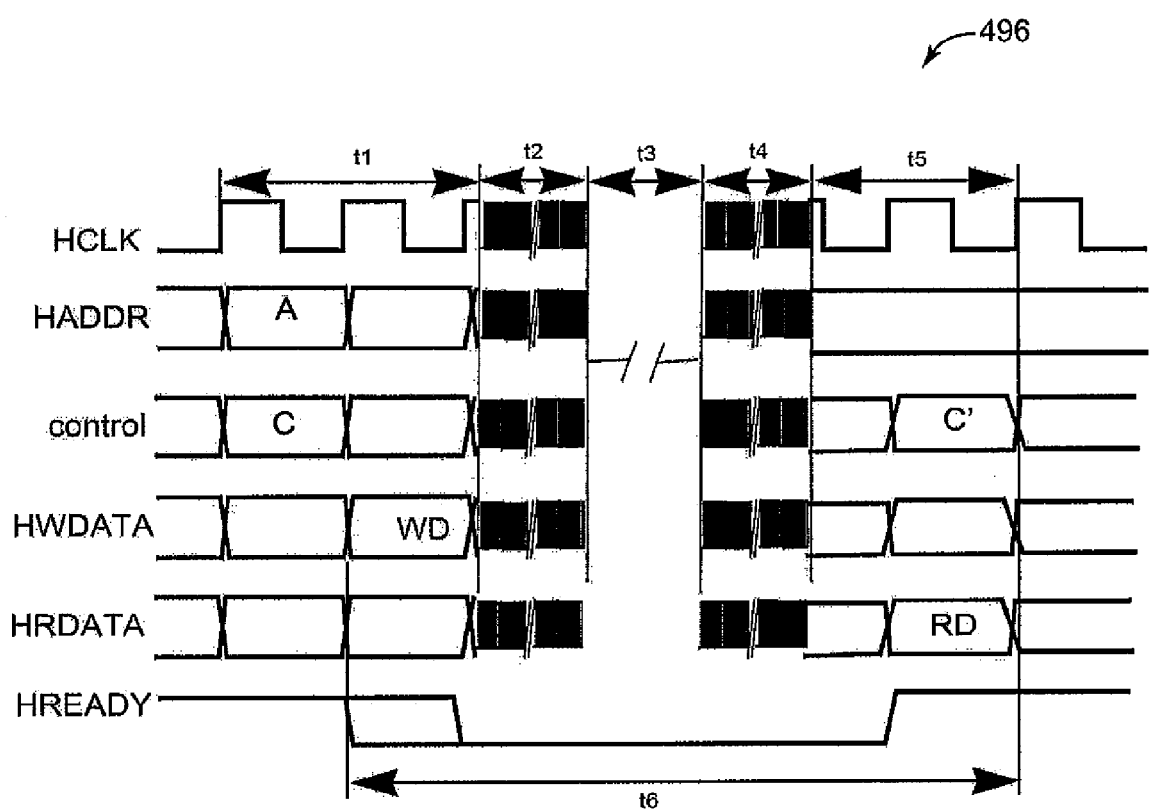
FIG. 19 is a timing diagram showing the timing for a transfer between the matrix and an AHB slave including the serialization of the present invention.

FIG. 19 is a timing diagram 496 showing the timing for a transfer between the matrix 106 and an AHB-Lite slave 146 including the serialization of the present invention. In the diagram, time t1 is the time for a standard two-cycle transfer. Time t2 is the time to capture and send serialized information to the slave. Time t3 is the time to recover serial information and provide it to the slave with the appropriate transfer. Time t4 is the time to receive the slave response and send it back to the other chip in serial mode. Time t5 is the time to reproduce the response from the slave at the other serializer and present it to the matrix. Time t6 is the time during which wait cycles can be automatically inserted.

The number of automatic inserted wait cycles depends on the ratio of the serial clock 124 to the HCLK signals 442 and 444. As the ratio increases, the number of wait cycles decreases.

Figure 20A:
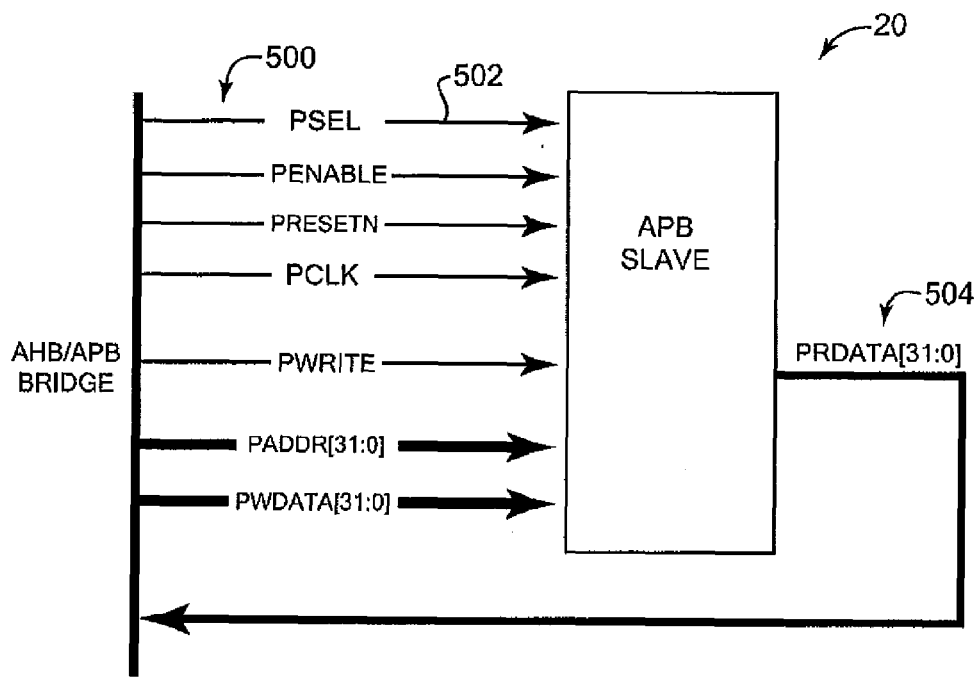
FIG. 20A is a block diagram illustrating a standard APB slave and its interface.

FIG. 20A is a block diagram illustrating a standard APB slave 20 and its interface. APB slave 20 responds to transfers initiated by the AHB/APB bridge 18 connected to the AHB matrix 12 and typically originating from a master. The interface required by the slave 20 includes control signals 500 provided from the AHB/APB bridge 18 by the APB bus, and which are generated by the bridge 18 according to the APB protocol timing, except for a PSEL signal 502 used by the slave 20 as a select signal to determine when it should respond to a bus transfer. The APB slave 20 provides output signal 504

Figure 20B:
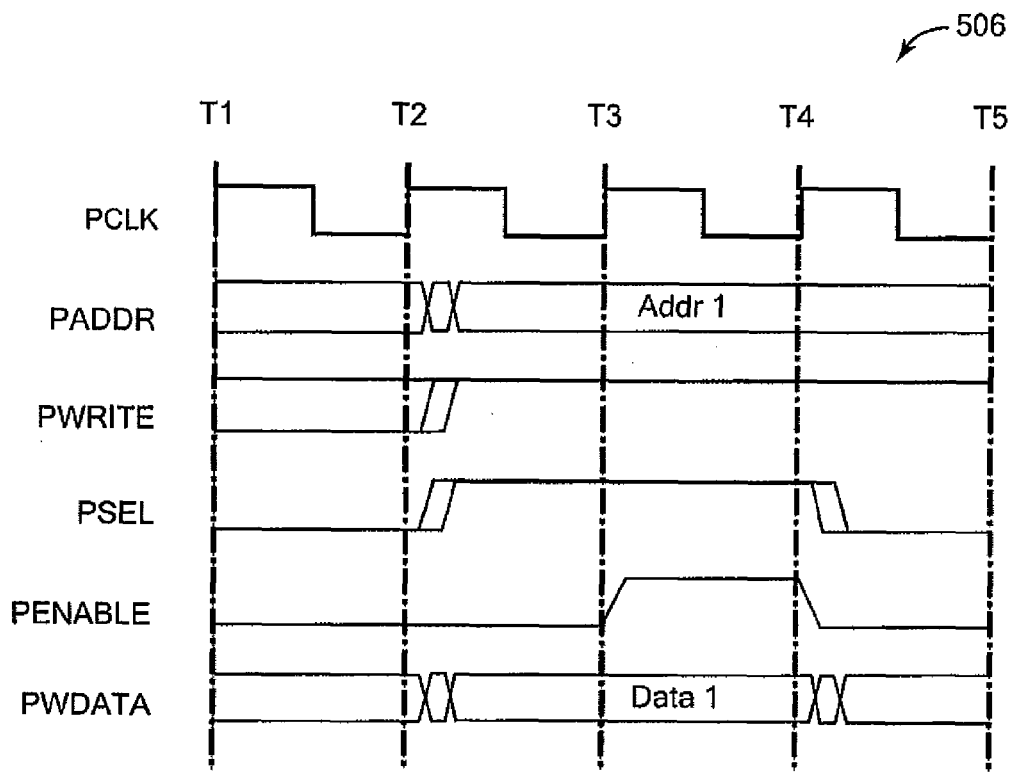
FIGS. 20B and 20C are timing diagrams showing the timing for a basic transfer for the APB slave of FIG. 20A.
Figure 20C:
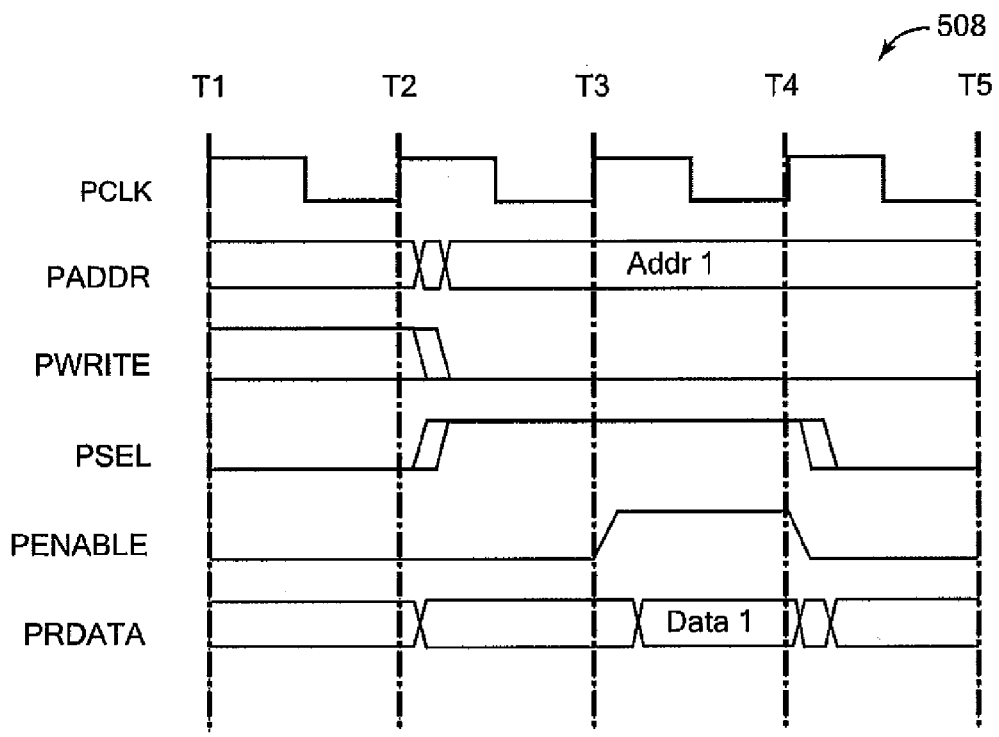

(HRDATA) back to the APB bus, where it is provided to the AHB/APB bridge 18. FIGS. 20B and 20C are a timing diagrams 506 and 508 showing the timing for a basic transfer for the APB slave 20, where timing diagram 506 shows the timing for a write transfer, and timing diagram 508 shows the timing for a reading transfer.

Figure 21:
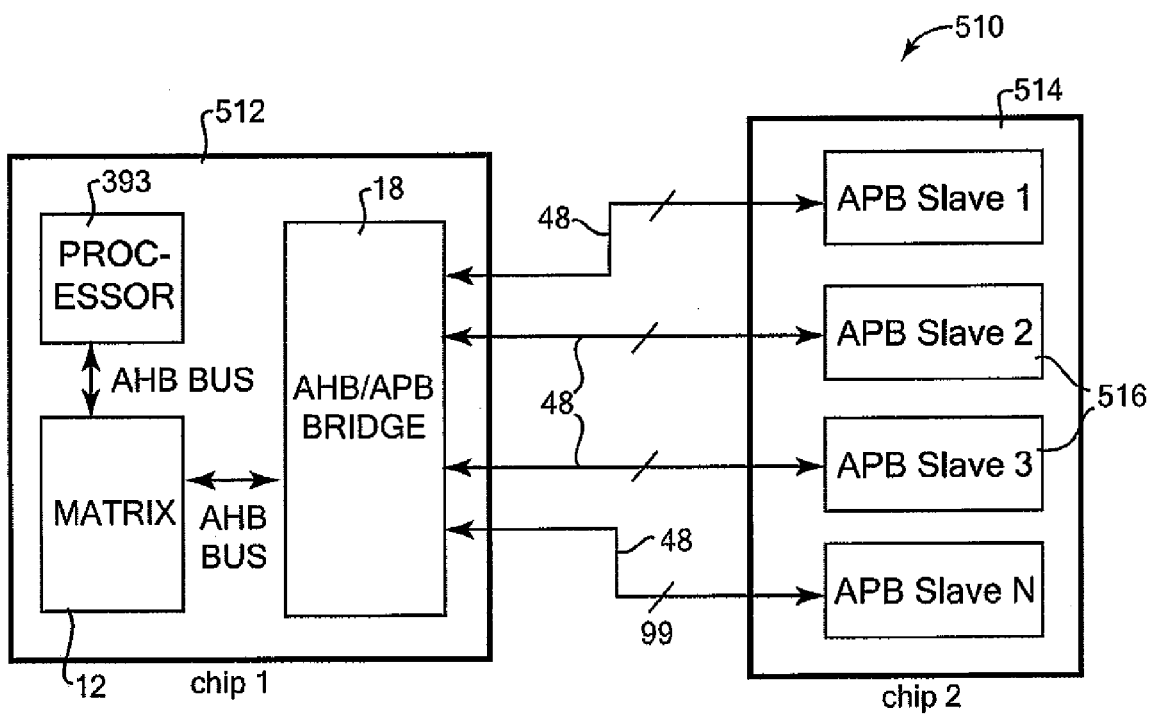
FIG. 21 is a block diagram showing a standard chip layout for APB slaves in a SoC of the prior art.

FIG. 21 is a block diagram showing a standard chip layout 510 for APB slaves in a SoC of the prior art. A first chip 512 includes an AHB matrix 12, an ARM processor 393 which can communicate with the matrix, and an AHB/APB bridge 18 for allowing interfacing between AHB and APB protocol peripherals. A second chip 514 includes a number of APB slaves 516. As shown, the prior art arrangement requires 99 communication lines (excluding PRESETN and PCLK signals) in each bus 48 that connects a single APB slave between chip 512 and chip 514. If multiple APB slaves are connected in this manner, as shown and which is commonly the case, the total number of communication lines needed increases greatly, which in turn increases the complexity and expense of the SoC.

Figure 22:
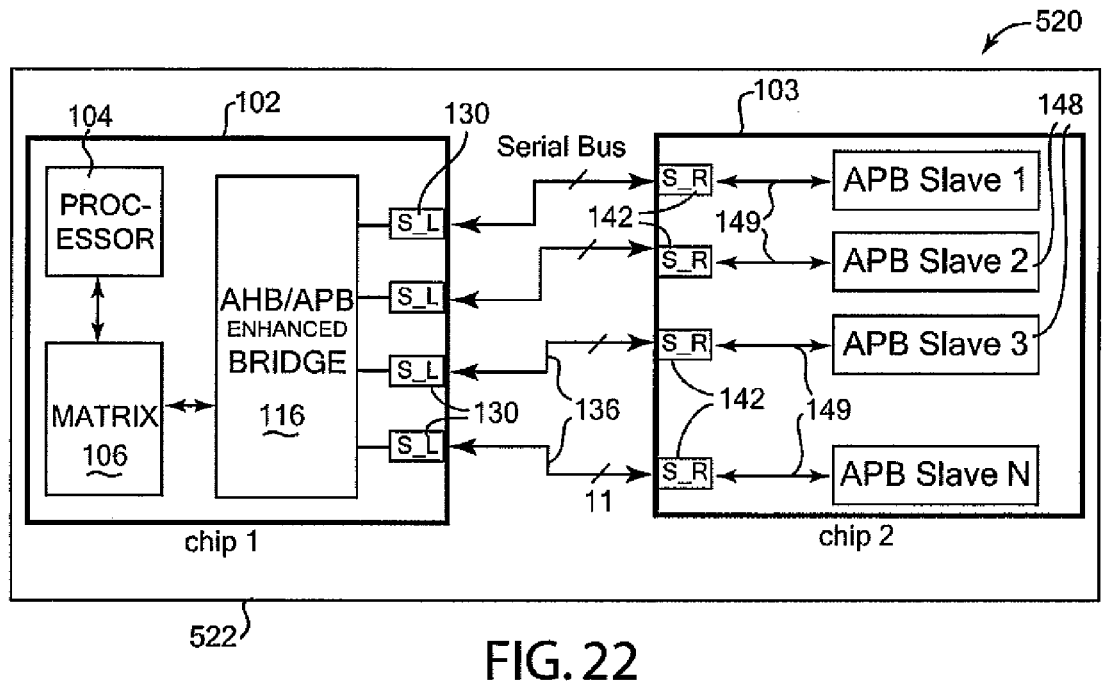
FIG. 22 is a block diagram of an example chip layout system for inter-chip slaves in a SoC of the present invention, where slaves use a different protocol than the matrix of the bus system.

FIG. 22 is a block diagram of an example chip layout system 520 for inter-chip slaves in a SoC of the present invention, where slaves use a different protocol than the matrix of the bus system. For example, chip layout system 520 can be provided on a board 522 or other suitable substrate or platform.

Board 522 includes first chip 102 and second chip 103 which is in communication with the first chip 102. The first chip 102 includes processor 104, AHB matrix 106, and enhanced AHB/APB bridge 116. Processor 104 can be any suitable controller as described above with respect to FIG. 3. The processor 104 is connected to matrix 106, which connects the slaves and masters of the system as described above. The APB slaves are allowed to communicate with one or more masters in the system. The matrix 106 can generate select signals for slaves and select which inputs from slaves are sent to a master, and also select the information to send to a slave.

The AHB/APB bridge 116 interfaces APB peripherals, such as the APB slaves of the present embodiment, with the AHB matrix 106. The AMBA-APB protocol does not specify wait cycles in the APB bus, yet wait cycles are needed for proper serialization in the present invention if the serial clock is not fast enough to complete a transfer in a single PCLK cycle. Thus, the bridge 116 is enhanced to allow a serializer to halt the bus transmissions, in consequence allowing the AHB/APB bridge 116 to insert wait cycles in the APB bus transfers. Other embodiments can use a different type of bridge to interface peripherals using one protocol with a matrix using a different protocol.

According to the present invention, each bus provided via the bridge 116 that is to be connected to a slave provided on a different chip, is connected to an APB slave serializer 130. The APB slave serializer 130 serializes information sent off chip or deserializes information being received from a different chip, as appropriate.

Chip 103 is also provided on board 520 and includes N APB slaves 148 for use with the APB bus architecture of chip 102. APB slaves 148 can be extra slaves as shown above in FIG. 3, or the required slaves of the system, as appropriate. Each APB slave 148 has a bus 149 which is to be connected to the other chip 102. In the system of the present invention, each bus 149 is connected to a APB slave serializer 142, which is similar to the slave serializers 130 provided on chip 102. Each APB slave serializer 142 is coupled to an associated APB slave serializer 130 by a bus 136. In the example shown, due to the serialization, only 11 lines are needed per bus, a significant reduction in required bus lines compared to other systems and methods. In the described embodiment, some of the communication channels are bi-directional, and thus allow the number of lines between the chips 102 and 103 to be minimized.

The method of the present invention is based on capturing the APB slave signals from the AHB/APB bridge, and inserting automatic wait states in order to comply with the APB protocol and to allow the serialization procedure to complete the transfer to a particular slave. The serializer method allows a reduction in the magnitude of the number of signals needed across the board, using simple fully-synchronous high-speed shift registers to serialize information between the APB slave 148 and the bridge 116. In order to achieve the serialization, a state machine is used to provide the control and the APB protocol. These operations are described in greater detail below with respect to FIG. 23.

Figure 23:
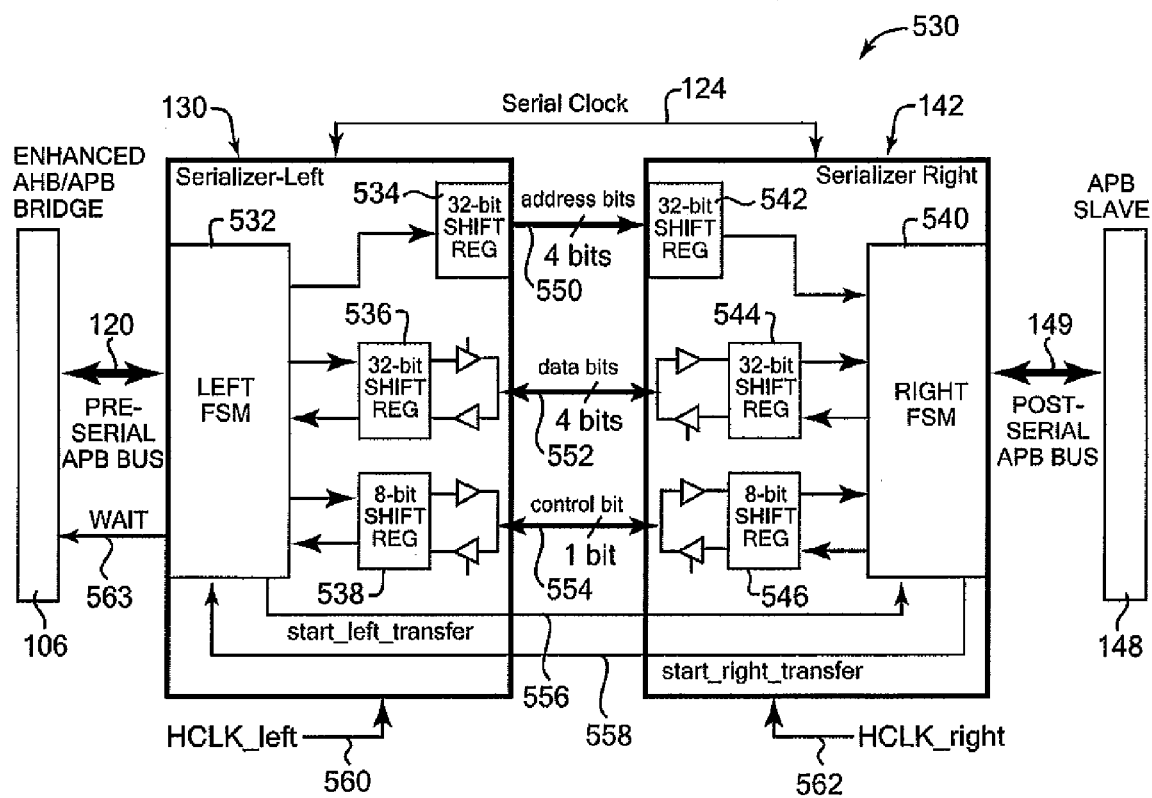
FIG. 23 is a block diagram illustrating an example embodiment of slave serializers of the present invention in an interface between an APB slave and enhanced AHB/APB bridge.

FIG. 23 is a block diagram illustrating an example embodiment 530 of the slave serializers 130 and 142 of the present invention in an interface between an APB slave 148 and enhanced AHB/APB bridge 116. In the example shown, serializer 130 includes a Left finite state machine (FSM) 532, two 32-bit shift registers 534 and 536, and an 8-bit shift register 538. The Left FSM 532 controls the operation of the serializer and introduces wait states to the bridge 116. This is described in greater detail below with respect to FIG. 24. In other embodiments, other controllers besides a finite state machine can be used. The two 32-bit shift registers 534 and 536 are used to serialize and deserialize information for the address bus and data bus. The 8-bit shift register 538 is used to serialize and deserialize the control signals used in the protocol. Shift registers of other bit widths can be used in other embodiments as appropriate.

Similarly, serializer 142 includes a Right finite state machine (FSM) 540, two 32-bit shift registers 542 and 544, and an 8-bit shift register 546. The FSM 540 controls the operation of the serializer 142 as described in greater detail below with respect to FIG. 27. The two 32-bit shift registers 542 and 544 are used to deserialize and serialize information for the address bus and data bus, and the 8-bit shift register 546 is used to deserialize and serialize the control signals used in the protocol. The synchronous shift registers of the serializers include an array of flip-flops and several multiplexers to determine the information flow between them, as well as buffers on the buses. One embodiment of the synchronous shift registers of the shift registers 534, 536, 542, and 544 includes components and operation similar to the operation of the shift registers 244, 246, 252, 254, respectively, as described above with reference to FIG. 10. 8-bit registers 538 and 546 operate similarly, except that they use only one s-bit line. There are no buffers provided on the output and input of registers 534 and 542 since these registers are unidirectional in the described embodiment.

Shift register 534 is connected to shift register 542 by an address bus 550, which is 4 bits wide in the example shown and can be uni-directional to allow the bridge 116 to address the APB slave 148 (the APB slave 148 does not need to send addresses). Shift register 536 is connected to shift register 544 by a bi-directional data bus 552 which is 4 bits wide in the example shown, and shift register 538 is connected to shift register 546 by a bi-directional control bus 554 which is one bit wide in the example shown. A start_left_transfer signal 556 is used by the Left FSM 532 to select a transfer of information from bridge to APB slave, and a start_right_transfer signal 558 is used by the Right FSM 540 to select a transfer of information from APB slave to bridge 116. These signals can be sent between the serializers via dedicated lines. A wait signal 563 from the serializer 130 to the bridge 116 is used to introduce wait cycles to the bridge 116. Serial clock signal 124 is provided to both the serializers 130 and 142 to coordinate their functions of serial communication. The use of these signals is described in greater detail with respect to FIGS. 24, 26 and 27.

PCLK signals 560 and 562 are provided to the serializers 130 and 142, respectively, and are the APB bus clocks for the chips 102 and 103 on which the serializers are provided. Herein, the PCLK_left and PCLK_right signals are assumed to be the same frequency, but can be different frequencies in other embodiments. Since the control for the shift registers is provided by the FSMs 532 and 540, the re-synchronized clock PCLK is needed to perform all operations. The serial clock 124 must be greater in frequency than each of the PCLK signals in order to keep good synchronization between both the PCLK and serial clock domains.

Figure 24:
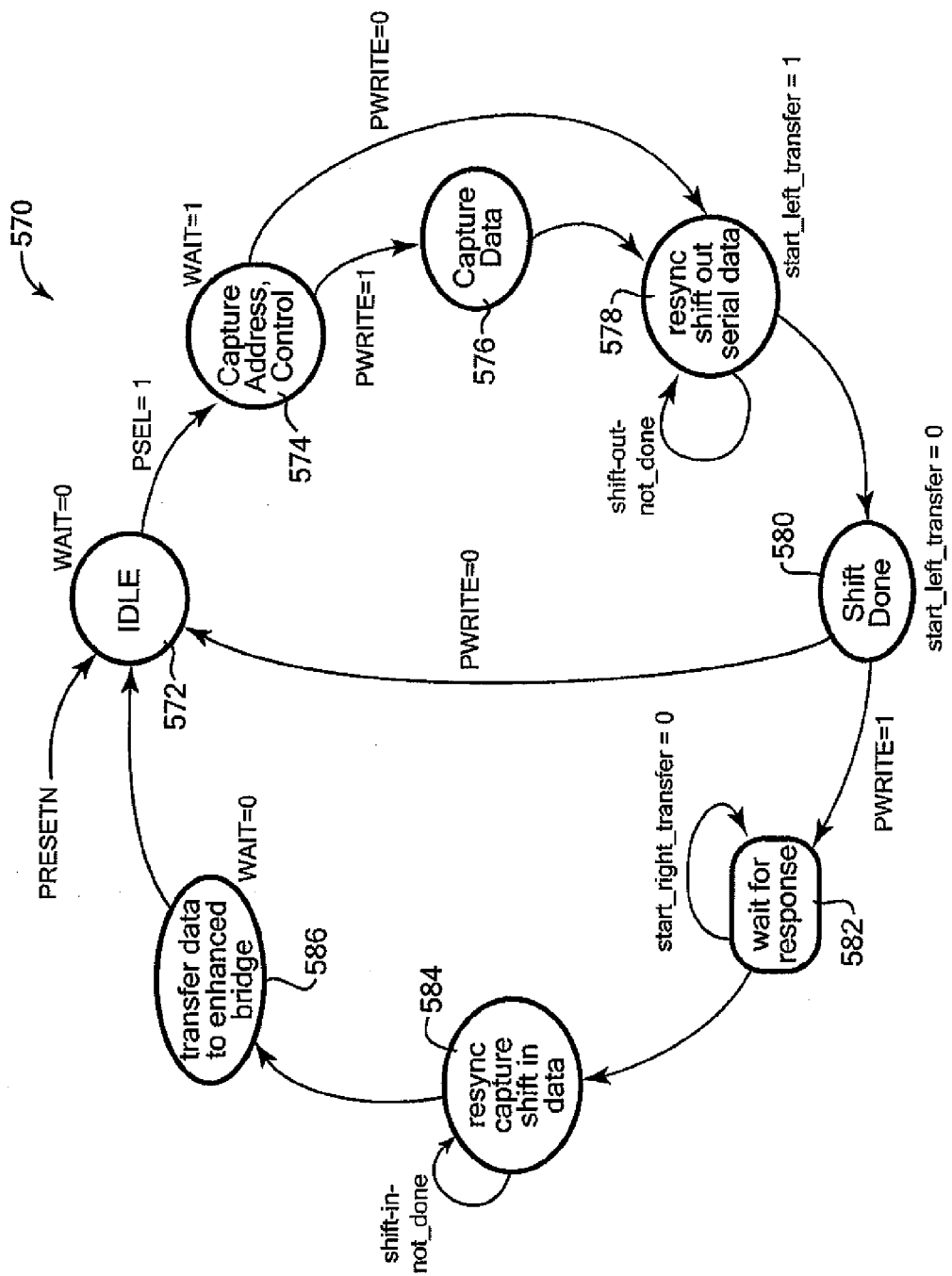
FIG. 24 is a flow diagram illustrating an example method or states of operation of the left finite state machine of the slave serializer on the chip of the enhanced bridge.

FIG. 24 is a flow diagram illustrating an example method 570 or states of operation of the Left FSM 532 of the slave serializer 130, provided on the chip 102 of the bridge 116. The FSM 532 controls and synchronizes all incoming information from the enhanced AHB/APB bridge 116, and sends a wait signal back to the bridge to insert wait cycles and allow the serialization procedure to be performed. The Left FSM 532 controls all the timing and re-synchronizes information incoming from PCLK_left to the domain of serial clock 124. This allows both sides (Left and Right) to have a synchronous high speed serial transfer.

At step 572, the Left FSM 532 is idle, waiting for a transfer from the bridge 116. The wait signal 563 is set to zero in this state. If the PRESETN signal is asserted by an external source (e.g., a controller on the chip or source external to the chip), this forces the FSM 532 to enter the idle state 572. Once the PSEL signal is asserted as 1, which selects the APB slave for a transfer from the bridge, then the process continues to step 574, in which the FSM 532 captures the address and control information from the bridge 116. Also, the wait signal is set to 1 to introduce automatic wait cycles. If the PWRITE signal is set high, then it is a write operation and the process continues to step 576 to capture the data signals from the bridge 116 and proceed to step 578. If PWRITE is low, it is a reading operation and no data signals are captured from the bridge, and the process proceeds to step 578 from step 574.

At step 578, the FSM 532 resynchronizes the shifting out based on the serial clock signal 124, loads the appropriate shift registers 534, 536, and 538 and shifts out information in serialized form to the other serializer 142 on the appropriate serial buses 550, 552, and 554. The Left FSM 532 also sets the start_left_transfer signal 556 high, which allows the Right FSM 540 to start capturing the synchronous incoming serial information. The wait signal 563 is maintained high, allowing the enhanced bridge 116 to insert automatic AHB wait cycles.

When the shifting out is complete, the process is at step 580, where the start_left_transfer signal 556 is set to zero. If the PWRITE signal is detected as zero, it is a write operation and data is not expected from the slave, and the process returns to step 572 so that the FSM 532 enters an idle state and the wait signal 563 is set to zero. If the PWRITE signal is not zero, it is a read operation, and at step 582, the FSM 532 waits for a response from the Right side, which would be indicated by the Right side setting start_right_transfer to 1. Once this occurs, the process continues to step 584 in which the Left FSM 532 resynchronizes and shifts in information received from the serial bus into parallel form, and continues the shifting until all the information is received. The FSM 532 re-synchronizes the incoming information from the high speed shift registers to the PCLK_left clock domain. In step 586, the received information is transferred to the enhanced bridge 116 and the wait signal is set to zero. The process then returns to step 572 to wait for another operation from the bridge 116.

Thus while the serialization is in progress (e.g., steps 574-586), the wait signal from the enhanced bridge 116 is held low, which introduces APB wait states. After the Left FSM 532 releases the wait signal, the bridge 116 sends back the answer from the APB slave to the bridge 116.

Figure 25:
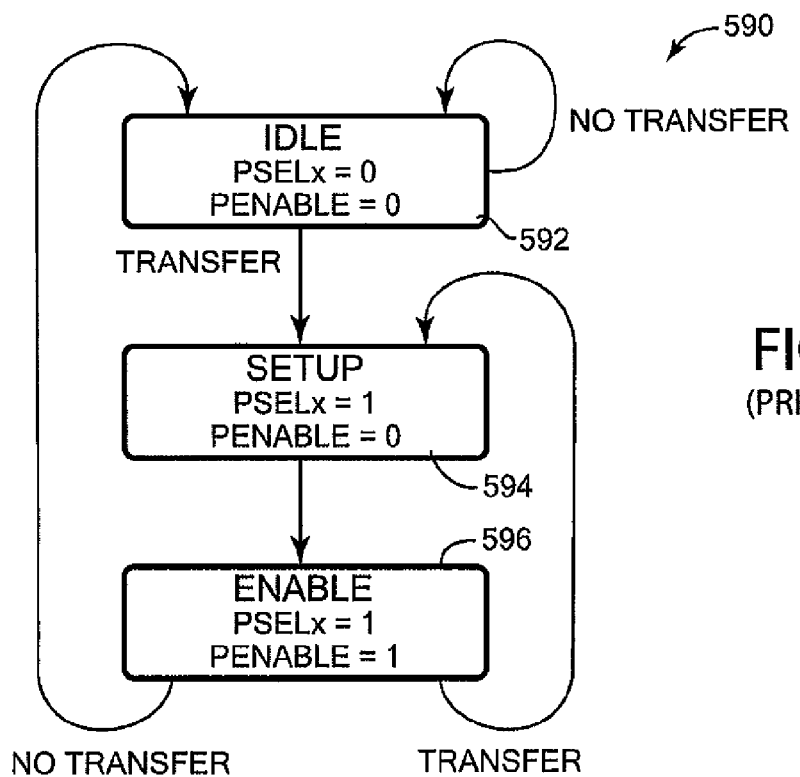
FIG. 25 is a flow diagram illustrating a standard finite state machine included in a AHB/APB bridge of the prior art.

FIG. 25 is a flow diagram illustrating a standard finite state machine 590 included in a AHB/APB bridge 18 of the prior art. In a step 592, the bridge FSM is in an idle state, in which the PSEL and PENABLE signals are zero. When a transfer occurs, the setup state 594 sets the PSEL signal high to select the addressed slave to respond. In the next enable state 596, PENABLE is set high to enable the slave for communication, which can then occur. If there is another transfer, the FSM returns to state 594, and if there is no transfer, the FSM returns to state 592. The standard specification for the AHB/APB bridge includes the support of wait cycles for the AHB side of the bridge, but does not include the support of wait cycles for the APB side.

Figure 26:
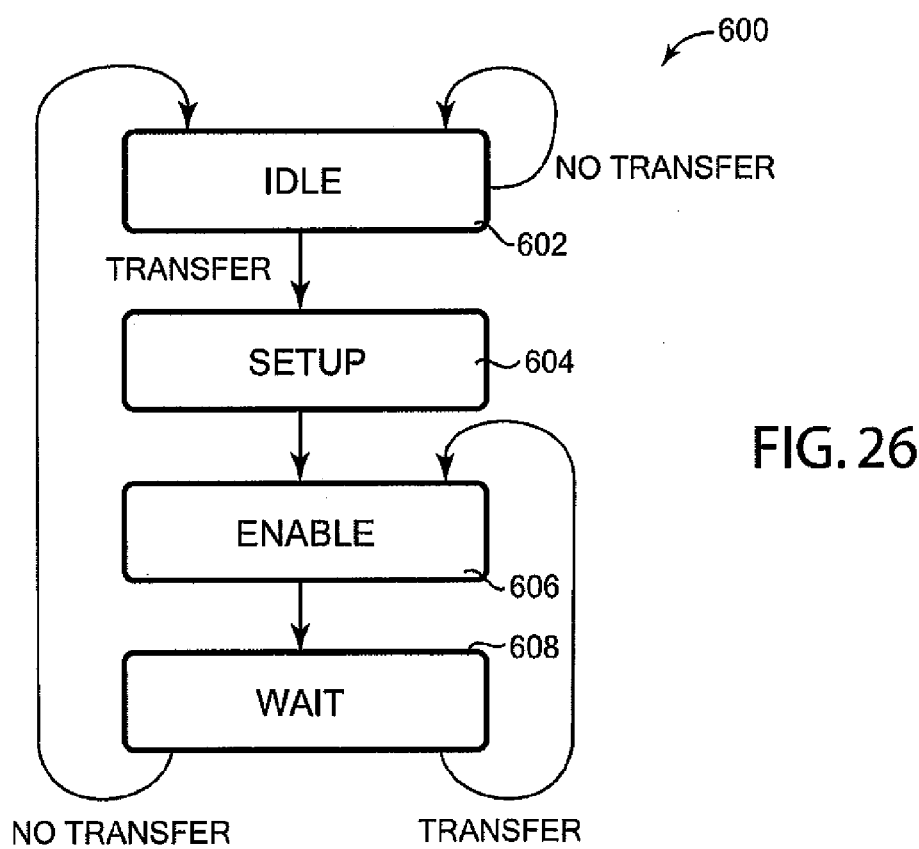
FIG. 26 is a flow diagram illustrating a method or states of operation for the enhanced AHB/APB bridge of the present invention.

FIG. 26 is a flow diagram illustrating a method 600 or states of operation for the enhanced AHB/APB bridge 116 of the present invention. The enhancement to the bridge 116 allows the support of the APB serialization as described above. The enhancement includes an extra state in the AHB/APB activity peripheral bus machine.

In a step 602, the activity peripheral bus machine of the bridge 116 is in an idle state and the PSEL and PENABLE signals are set low. The idle state continues while no transfers are received by the bridge. When a transfer is received, the setup step 604 is performed to set the PSEL signal to 1 to select the addressed slave. In the enable step 606, the PENABLE signal is set high to enable the slave for communication, which then begins. The wait step 608 of the present invention causes the machine of the bridge 116 to wait as instructed by the wait signal 563 from the Left FSM 532 in the serializer, during which time the communication to the slave is serialized and sent, and any response is serialized and returned. After the wait signal 563 is asserted high by the Left FSM, when serial communication is complete, the machine returns to step 604 if another transfer is received, or returns to step 602 if no additional transfer is occurring.

Figure 27:
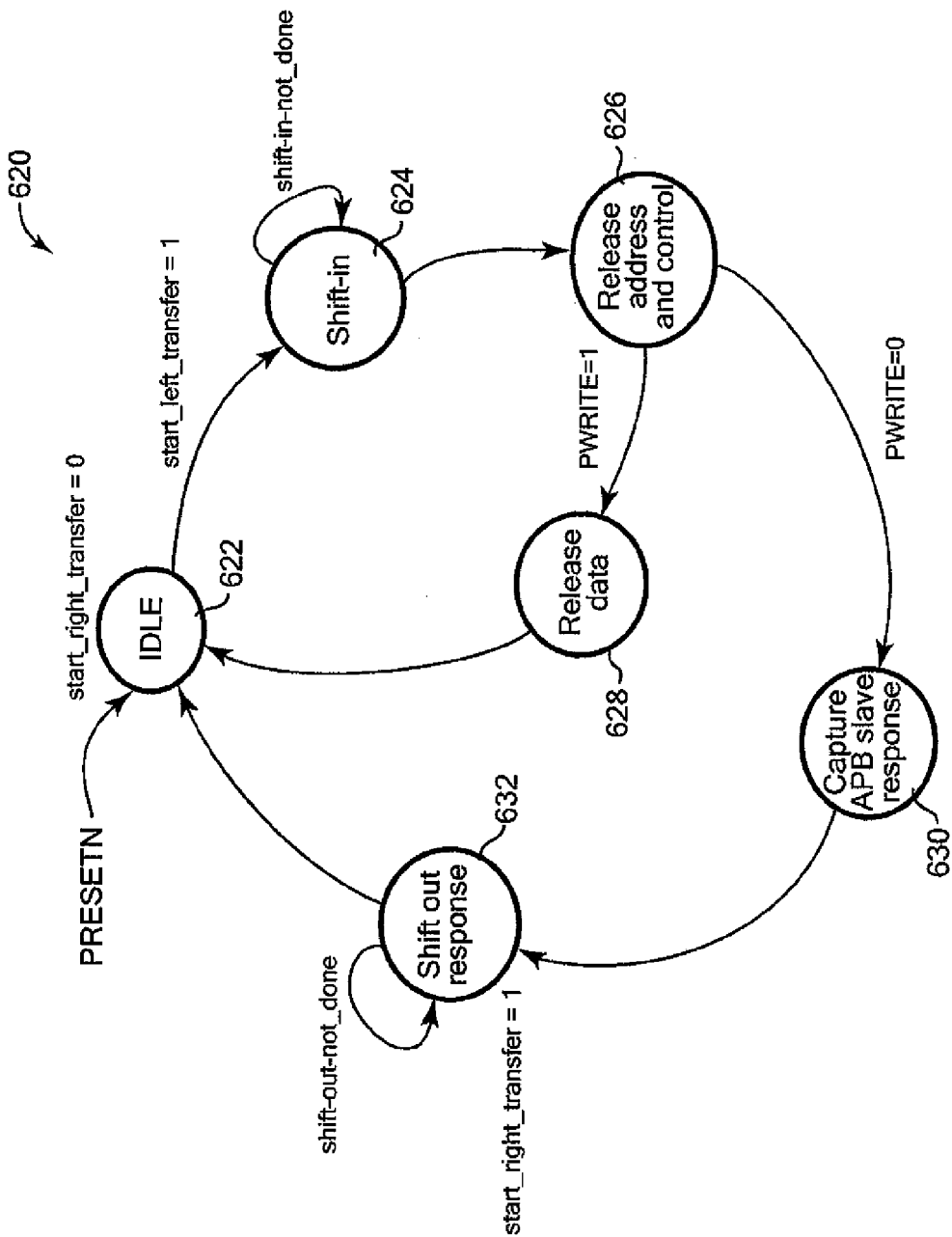
FIG. 27 is a flow diagram illustrating an example method or states of operation of the right finite state machine of the APB slave serializer provided on the chip of the APB slave.

FIG. 27 is a flow diagram illustrating an example method 620 or states of operation of the Right FSM 540 of the APB slave serializer 142, provided on the chip 103 of the APB slave 148. The Right FSM 540 is the complement of the system, and controls all timing and signals that talk to the APB slave 148.

As shown at step 622, the FSM 540 waits until the start_left_transfer signal 556 is one. (The PRESETN signal forces the FSM 540 to enter the idle state step 622.) When the start_left_transfer signal is set to 1 by the Left FSM 532, the Right FSM 540 enters step 624, in which the FSM 540 shifts in the serial information until complete to provide the information in parallel form. In next step 626, the parallel address and control information are released to the APB slave. If the PWRITE signal from the bridge 116 is high, indicating a write operation, then the FSM 540 also releases the received data information to the APB slave 148 in step 628, and the process returns to step 622 to set the start_right_transfer signal 558 low and go into an idle state (since no APB slave response is expected for a write operation). If the PWRITE signal from the slave is zero, then it is a read operation with no data information and the process continues from step 626 to step 630.

In step 630, the process waits if necessary and captures the APB slave's response. In next step 632, the FSM 540 sets the start_right_transfer signal to 1, and shifts out the slave's response back over the communication bus and to the other serializer 130 so that the bridge 116 will receive the response. The process then returns to step 622 to set the start_right_transfer signal low and wait for another transfer.

Figure 28A:
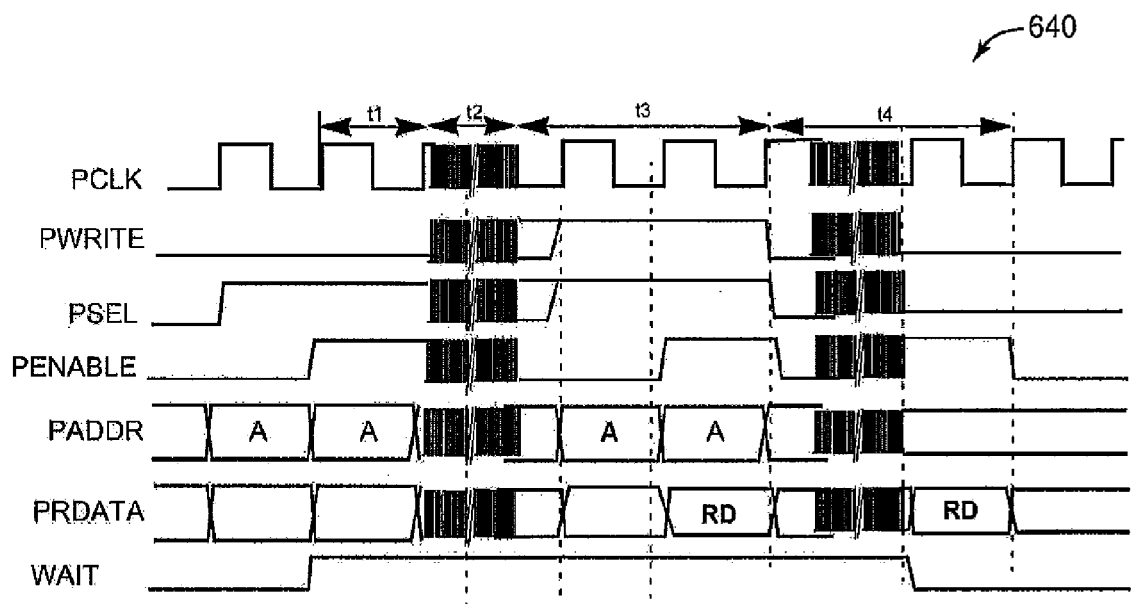
FIG. 28A is a timing diagram showing the timing for a read transfer between the enhanced bridge and the APB slave including the serialization of the present invention.

FIG. 28A is a timing diagram 640 showing the timing for a read transfer between the enhanced bridge 116 and the APB slave peripheral 148, including the serialization of the present invention. In the diagram, time t1 is the time for a standard read transfer. Time t2 is the time to capture and send serial information to the APB slave. Time t3 is the time to recover serial information and reproduce the operation in the APB slave. Time t4 is the time to recover and transfer back the response information to the enhanced bridge 116. Time t6 is the time during which wait cycles can be automatically inserted.

The number of automatic inserted wait cycles depends on the ratio of the serial clock 124 to the PCLK signals 560 and 562. As the ratio increases, the number of wait cycles decreases.

Figure 28B:
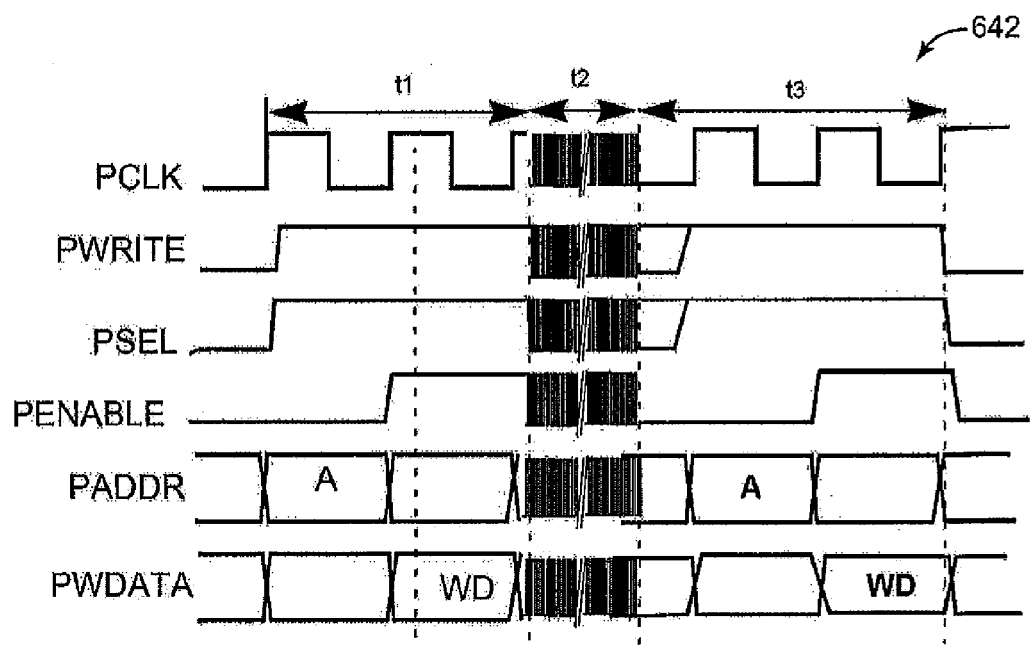
FIG. 28B is a timing diagram showing the timing for a write transfer between the enhanced bridge and the APB slave including the serialization of the present invention.

FIG. 28B is a timing diagram 642 showing the timing for a write transfer between the enhanced bridge 116 and the APB slave peripheral 148, including the serialization of the present invention. In the diagram, time t1 is the time for a standard write transfer. Time t2 is the time to capture and send serialized information to the APB slave. Time t3 is the time to recover the serial information at the other chip and reproduce the operation in the APB slave.

Figure 29:
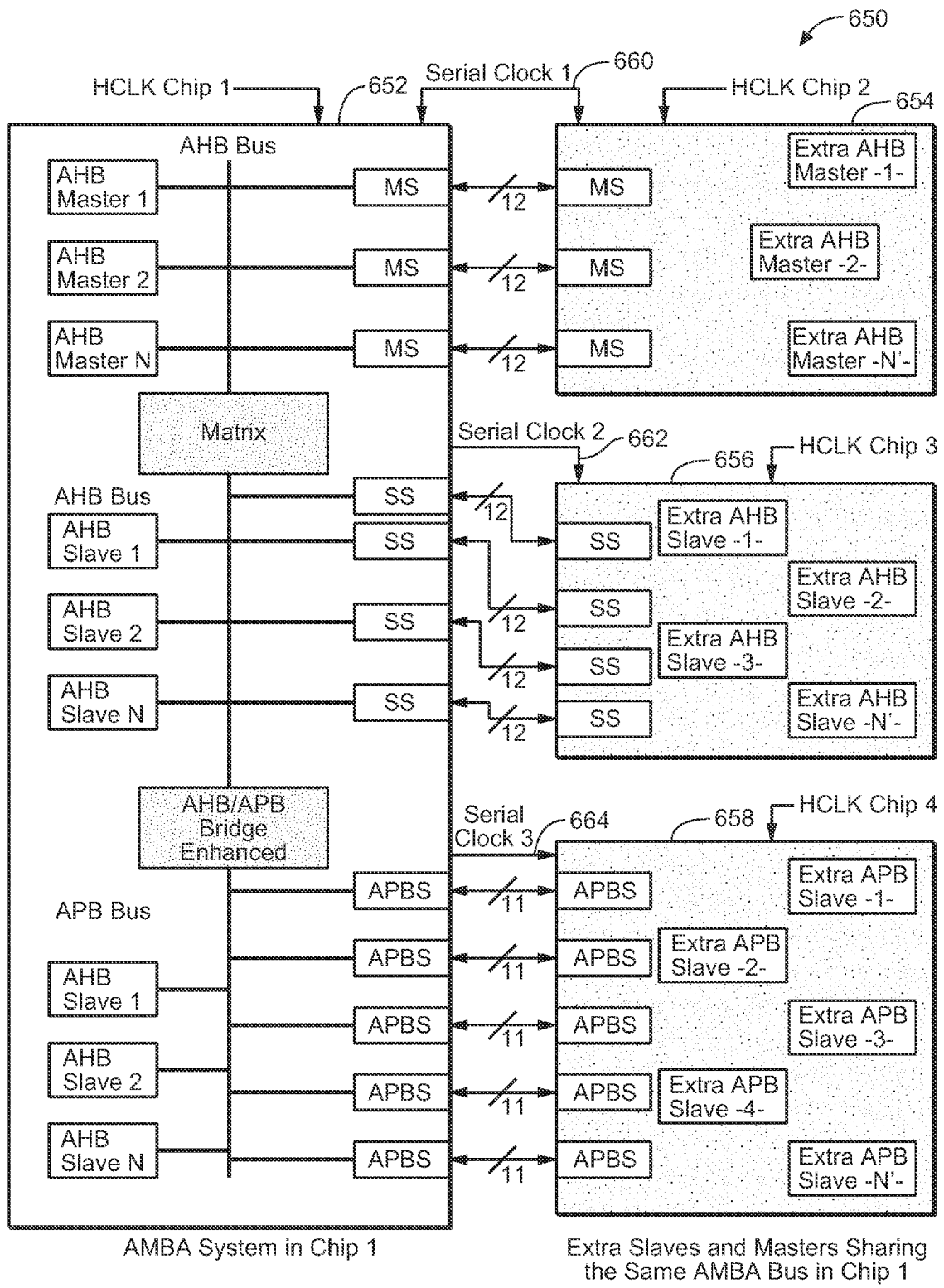
FIG. 29 is a block diagram illustrating a different embodiment of a multi-chip bus architecture system of the present invention.

FIG. 29 is a block diagram illustrating a different embodiment 650 of a multi-chip bus architecture system of the present invention. System 650 includes four different chips, chips 652, 654, 656, and 658. Several of the extra masters and slaves of the system are spread out on the multiple chips.

Due to the nature of the serializers, the system can be divided into several clock domains. The AHB clock HCLK can be made independent on each chip and not have any relationship with other HCLK signals on other chips of the system. Thus, not all of the HCLK signals need be balanced nor the same frequency as each other. The main requirement is in the serial clock: this should balance between both serializers at the ends of a communication bus.

In the described embodiment of FIG. 29, the HCLK signals are independent of each other, and serial clocks 660, 662, and 664 are also independent of each other. For example, serial clock 660 can be different from serial clock 662 and serial clock 664. Each serial clock, however, is balanced between its own serializers; otherwise, the serial communication will not operate correctly and information can be lost.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A serializer comprising:
   one or more shift registers operative to serialize information to send over a communication bus and deserialize information received from the communication bus; and
   a mechanism coupled to the shift registers and operative to provide parallel bus information from a master to the shift registers for serialization, wherein the mechanism is operative to provide deserialized information received from the shift registers to the master, and wherein the mechanism is configured to insert one or more wait cycles in communication with the master during the serialization and deserialization.

2. The serializer of claim 1 wherein the mechanism is a finite state machine.

3. The serializer of claim 1 wherein the shift registers are configured to send serial information over the communication bus to a bus matrix provided on a device that is different from a device on which the master is provided.

4. The serializer of claim 3 wherein the bus matrix is configured to provide the information sent over the communication bus to a slave addressed by the information from the master.

5. The serializer of claim 1 wherein the shift registers are configured to provide serial information from the communication bus, the received serial information derived from information provided by a bus matrix provided on a device that is different from a device on which the master is provided.

6. The serializer of claim 5 wherein the information provided by the bus matrix is a response from a slave addressed by information from the master.

7. The serializer of claim 1 wherein the shift registers include an address signal shift register, a data signal shift register, and a control signal shift register.

8. The serializer of claim 1 wherein the mechanism is configured to resynchronizes information provided based on a serial clock during serial transmission, to a clock governing the operation of the master.

9. The serializer of claim 1 wherein each of the shift registers includes a plurality of flip-flops and multiplexers, and a buffer on each tap of the shift register.

10. The serializer of claim 1 further comprising a second serializer is coupled to the other end of the communication bus to deserialize the information sent on the communication bus by the shift registers and to serialize the information received on the communication bus by the shift registers.

11. The serializer of claim 1 wherein the master is an Advanced High Performance Bus (AHB) master which uses an Advanced Microcontroller Bus Architecture (AMBA) bus protocol.

12. A method comprising:
   receiving parallel bus information from a master, the parallel bus information addressed to a slave;
   serializing the parallel bus information and sending the serial information on a communication bus; and
   inserting a wait cycle to the master during the serialization of the parallel bus information and sending of serial information.

13. The method of claim 12 further comprising:
   waiting for an indication that a response is being sent over the communication bus from the addressed slave; and
   receiving and deserializing the response to provide the response to the master, wherein the wait cycle to the master extends until the response is ready to provide to the master.

14. The method of claim 12 wherein the receiving parallel bus information and inserting a wait cycle are performed by a finite state machine, and the serializing and deserializing of information is performed using one or more shift registers.

15. The method of claim 12 wherein the serial information is sent over the communication bus to a matrix provided on a different device than a device on which the master is provided, wherein the matrix provides the information sent over the communication bus to a slave addressed by the information from the master.

16. The method of claim 12 wherein the received serial information from the communication bus is provided by a matrix provided on a different device than a device on which the master is provided, wherein the serial information provided by the matrix is derived from a response from a slave addressed by the information from the master.

17. The method of claim 12 further comprising resynchronizing the received serial information from a serial clock provided during serial transmission, to a clock governing the operation of the master.

18. The method of claim 12 wherein the master is an Advanced High Performance Bus (AHB) master which uses an Advanced Microcontroller Bus Architecture (AMBA) bus protocol.

19. A method comprising:
receiving serial information on a communication bus, the serial information derived from information provided by a master and addressed to a slave;
deserializing the serial information to obtain parallel information and providing the parallel information to a bus matrix for sending to the slave; and
receiving and serializing a response to the parallel information from the bus matrix to provide the response to the master.

20. The method of claim 19 wherein the providing parallel information to the bus matrix is performed by a finite state machine, and the deserializing and serializing of information is performed using one or more shift registers.

21. The method of claim 19 wherein the master is provided on a different device than a device on which the matrix is provided.

22. The method of claim 19 wherein the received serial information from the communication bus is provided by a serializer provided on a different device than a device on which the matrix is provided.

23. The method of claim 19 further comprising resynchronizing the received serial information from a serial clock provided during serial transmission, to a clock governing the operation of the matrix.

24. A system comprising:
a master operative to read and write information to a slave of the system, wherein the master is provided on a first device;
a first serializer coupled to the master and provided on a first device, the first serializer operative to serialize the information received from the master and send the serialized information over a communication bus;
a second serializer provided on a second device and coupled to the communication bus, the second serializer operative to receive the serialized information and deserialize the serialized information; and
a bus matrix provided on the second device and coupled to the second serializer, the bus matrix operative to select destinations for information on multiple buses connected to the bus matrix, wherein the deserialized information is provided to the bus matrix to be routed to the slave.

25. The system of claim 24 wherein the first device is a first integrated circuit chip and the second device is a second integrated circuit chip.

26. The system of claim 24 wherein the first and second serializers are operative to introduce automatic wait cycles in the master to allow the serialization of the information.

27. A computer readable medium including program instructions to be implemented by a computer and for interfacing bus communications for a master in a bus system, the program instructions for:
receiving parallel bus information from a master, the parallel bus information addressed to a slave;
serializing the parallel bus information and sending the serial information on a communication bus; and
inserting a wait cycle to the master during the serialization of the parallel bus information and sending of serial information.

28. A computer readable medium including program instructions to be implemented by a computer and for interfacing bus communications for a master in a bus system, the program instructions for:
receiving serial information on a communication bus, the serial information derived from information provided by a master and addressed to a slave;
deserializing the serial information to obtain parallel information and providing the parallel information to a bus matrix for sending to the slave; and
receiving and serializing a response to the parallel information from the bus matrix to provide the response to the master.

* * * * *